United States Patent
Kusaka et al.

(10) Patent No.: US 8,307,926 B2
(45) Date of Patent: Nov. 13, 2012

(54) HYBRID VEHICLE

(75) Inventors: Yasushi Kusaka, Toyota (JP); Kimitoshi Tsuji, Susono (JP); Shuichi Ezaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1245 days.

(21) Appl. No.: 11/991,352

(22) PCT Filed: Nov. 14, 2006

(86) PCT No.: PCT/JP2006/322598
§ 371 (c)(1),
(2), (4) Date: Mar. 19, 2008

(87) PCT Pub. No.: WO2007/060853
PCT Pub. Date: May 31, 2007

(65) Prior Publication Data
US 2009/0152027 A1    Jun. 18, 2009

(30) Foreign Application Priority Data
Nov. 24, 2005    (JP) .................................. 2005-338569

(51) Int. Cl.
B60W 10/06    (2006.01)

(52) U.S. Cl. ............................... 180/65.28; 180/65.265

(58) Field of Classification Search ................ 180/65.28, 180/65.21, 65.265, 65.275, 65.285
See application file for complete search history.

(56) References Cited

U.S. PATENT DOCUMENTS

| | | | |
|---|---|---|---|
| 6,543,561 B1 | 4/2003 | Pels et al. | |
| 6,943,460 B2* | 9/2005 | Wakashiro et al. | 290/40 C |
| 6,950,739 B2* | 9/2005 | Matsubara et al. | 701/103 |
| 6,986,335 B2* | 1/2006 | Sieber et al. | 123/320 |
| 7,191,746 B2* | 3/2007 | Nakamura | 123/179.3 |
| 7,246,673 B2* | 7/2007 | Vahabzadeh et al. | 180/65.28 |
| 7,470,209 B2* | 12/2008 | Holmes et al. | 477/3 |
| 7,540,344 B2* | 6/2009 | Yamamoto et al. | 180/65.285 |
| 2003/0236599 A1* | 12/2003 | Saito et al. | 701/22 |
| 2004/0026928 A1* | 2/2004 | Wakashiro et al. | 290/40 C |
| 2004/0251064 A1 | 12/2004 | Imai | |

FOREIGN PATENT DOCUMENTS

| | | |
|---|---|---|
| DE | 198 14 402 A1 | 10/1999 |
| EP | 1186753 A2 * | 3/2002 |
| JP | A 2000-145486 | 5/2000 |
| JP | A 2002-266670 | 9/2002 |
| JP | A 2004-324442 | 11/2004 |
| JP | A 2005-001563 | 1/2005 |
| JP | A 2005-307757 | 11/2005 |

OTHER PUBLICATIONS

European Search Report issued in European Patent Application No. 06 82 3372 on Apr. 15, 2010.

* cited by examiner

*Primary Examiner* — Katy M Ebner
(74) *Attorney, Agent, or Firm* — Oliff & Berridge, PLC

(57) ABSTRACT

There is provided a hybrid vehicle capable of attaining excellent acceleration response and reducing pumping loss. When an engine combustion stop demand is issued, the engine is associatively rotated by carrying out a fuel cut-off operation and controlling the speed of a generator to control the engine in such a way that the speed of the engine becomes a predetermined speed NE1. During the associative rotation, intake and exhaust valves are held at their fully closed positions.

2 Claims, 20 Drawing Sheets

HYBRID VEHICLE

TECHNICAL FIELD

The present invention relates to a hybrid vehicle having an engine and a motor as drive sources.

BACKGROUND ART

There has been known an apparatus for a diesel hybrid vehicle, the apparatus using, when the vehicle is started, a motor to drive the vehicle and engaging a clutch to associatively rotate the diesel engine (see the following Patent Document 1, for example). Such an apparatus can further improve warm-up performance by closing an exhaust valve during an associative rotation of the diesel engine.

[Patent Document 1] JP-A-2004-324442

DISCLOSURE OF THE INVENTION

Problem to be Solved by the Invention

At the time of deceleration or low-load driving, fuel consumption can be improved by carrying out a fuel cut-off operation to stop combustion in the engine and by using the motor to drive the vehicle. However, when the engine is restarted, engine speed does not rise quickly, probably resulting in poor acceleration response.

Further, closing the exhaust valve during motor-based driving as in the apparatus described above causes pumping loss because air flows between an intake path and the cylinder via an intake valve. As a result, it is necessary to increase output of the motor, and hence electricity consumption in the battery may increase.

The present invention has been made to solve the problems described above. An object of the present invention is to provide a hybrid vehicle capable of attaining an excellent acceleration response and capable of reducing pumping loss.

Means for Solving the Problem

The first aspect of the present invention is a hybrid vehicle including an engine and other drive means as drive sources, the hybrid vehicle comprising: engine rotation control means for rotating the engine at a predetermined speed when combustion is stopped in the engine; variable valve mechanisms capable of changing valve opening characteristics of intake and exhaust valves for each cylinder; variable valve mechanisms control means for controlling the variable valve mechanisms to hold the intake and exhaust valves closed for at least one cylinder while the engine rotation control means rotates the engine when the combustion is stopped in the engine; and combustion start control means for starting the combustion in the engine while the engine rotation control means rotates the engine.

The second aspect of the present invention is the hybrid vehicle according to the first aspect of the present invention, wherein the engine rotation control means rotates the engine at the predetermined speed by controlling a speed of a generator according to a speed of wheels when the vehicle is driving.

The third aspect of the present invention is the hybrid vehicle according to the first aspect of the present invention, wherein the variable valve mechanisms control means control the valve opening characteristics of the intake valve in such a way that an intake air mount into the cylinder is reduced before the intake and exhaust valves are held closed.

The fourth aspect of the present invention is the hybrid vehicle according to the first aspect of the present invention, wherein the variable valve mechanisms include a first variable valve mechanism capable of changing the valve opening characteristics of the exhaust valve for a plurality of cylinders by driving an electric motor, and the variable valve mechanisms control means drives the electric motor of the first variable valve mechanism in such a way that the number of cylinders whose exhaust valves can be held closed is maximized.

The fifth aspect of the present invention is the hybrid vehicle according to the fourth aspect of the present invention, wherein the variable valve mechanisms control means drive the electric motor of the first variable valve mechanism in such a way that the exhaust valve for the cylinder whose exhaust valve is held open is held at a maximum lift position.

The sixth aspect of the present invention is the hybrid vehicle according to the first aspect of the present invention, further comprising air-fuel mixture holding means for holding air-fuel mixture in the cylinder by sucking the air-fuel mixture into a cylinder and by inhibiting ignition of the air-fuel mixture before the operation of the intake and exhaust valves is stopped, wherein the engine rotation control means rotates the engine with the air-fuel mixture held in the cylinder by the air-fuel mixture holding means, and the combustion start control means ignites the air-fuel mixture held in the cylinder.

The seventh aspect of the present invention is the hybrid vehicle according to the sixth aspect of the present invention, further comprising: warm-up state detection means for detecting a warm-up state of the engine; and holding cylinder number changing means for changing the number of cylinders in which the air-fuel mixture is held by the air-fuel mixture holding means according to the warm-up state detected by the warm-up state detection means.

The eighth aspect of the present invention is the hybrid vehicle according to the first aspect of the present invention, further comprising: rotation necessity prediction means for predicting necessity of rotating the engine at the predetermined speed when the combustion is stopped in the engine; and switching control means for switching between a mode in which the engine is rotated by the engine rotation control means and a mode in which the engine is not rotated by the engine rotation control means according to the necessity predicted by the rotation necessity prediction means.

The ninth aspect of the present invention is the hybrid vehicle according to the eighth aspect of the present invention, wherein the rotation necessity prediction means includes navi-information receiving means for receiving navigation information, and predicts the necessity based on the navigation information.

The tenth aspect of the present invention is the hybrid vehicle according to the eighth aspect of the present invention, wherein the rotation necessity prediction means includes battery voltage decrease calculation means for calculating an amount of decrease in battery voltage, and predicts the necessity based on the amount of decrease.

The eleventh aspect of the present invention is the hybrid vehicle according to the first aspect of the present invention, further comprising: driver's demand receiving means for receiving a driver's demand that determines whether or not the engine is rotated at the predetermined speed when the combustion is stopped in the engine; and switching control means for switching between a mode in which the engine is rotated by the engine rotation control means and a mode in which the engine is not rotated by the engine rotation control means according to the demand received by the driver's demand receiving means.

Effects of the Invention

According to the first aspect of the present invention, by rotating the engine at the predetermined speed when combustion is stopped in the engine and by starting the combustion in the engine while the engine is rotating, the engine speed can be quickly raised, so that acceleration response can be improved. Further, pumping loss can be reduced by holding the intake and exhaust valves closed while the engine is rotating when combustion is stopped in the engine.

According to the second aspect of the present invention, by controlling the speed of the generator according to the speed of wheels, the engine can be controlled in such a way that the speed thereof becomes a predetermined speed at which excellent engine startup performance is attained and less friction is generated.

According to the third aspect of the present invention, by holding the intake and exhaust valves closed after the intake air mount into the cylinder is reduced, compression torque variation can be sufficiently reduced.

According to the fourth aspect of the present invention, by maximizing the number of cylinders whose exhaust valves can be held closed, pumping loss can be reduced even when the first variable valve mechanism is used.

According to the fifth aspect of the present invention, by using the first variable valve mechanism, the exhaust valve is held at the maximum lift position for the cylinders whose exhaust valve held opened. Thus, pumping loss can be minimized.

According to the sixth aspect of the present invention, since the air-fuel mixture held in the cylinder is ignited to start combustion, the ignition can be carried out early. The acceleration response can thus be further improved. Moreover, by rotating the engine with the air-fuel mixture held in the cylinder, atomization of the air-fuel mixture can be facilitated and the temperature of the air-fuel mixture can be increased. As a result, the engine startup performance can be improved.

According to the seventh aspect of the present invention, changing the number of cylinders that holds the air-fuel mixture according to the warm-up state of the engine can adequately balance the tradeoff between the improvement in engine startup performance and the improvement in output torque.

According to the eighth aspect of the present invention, the control is switched between the mode in which the engine is rotated by the engine rotation control means and the mode in which the engine is not rotated by the engine rotation control means according to the necessity predicted by the rotation necessity prediction means. Therefore, when the necessity is high, excellent acceleration response can be attained by using the engine rotation control means to rotate the engine. On the other hand, when the necessity is low, the engine is not rotated by the engine rotation control means, so that the fuel consumption can be improved. It is thus possible to adequately balance the tradeoff between the improvement in the acceleration performance and the improvement in the fuel consumption.

According to the ninth aspect of the present invention, since the necessity of using the engine rotation control means to rotate the engine is predicted based on the navigation information, the necessity can be predicted in an accurate manner.

According to the tenth aspect of the present invention, since the necessity of using the engine rotation control means to rotate the engine is predicted based on the amount of decrease in battery voltage, the necessity can be predicted in an accurate manner.

According to the eleventh aspect of the present invention, the control is switched between the mode in which the engine is rotated by the engine rotation control means and the mode in which the engine is not rotated by the engine rotation control means according to the driver's demand that determines whether or not the engine is rotated at the predetermined speed when combustion is stopped in the engine. Therefore, when no demand to rotate the engine is issued, the engine is not rotated by the engine rotation control means, so that the fuel consumption can be improved. It is thus possible to adequately balance the tradeoff between the improvement in the acceleration response and the improvement in the fuel consumption.

BEST MODE FOR CARRYING OUT THE INVENTION

Embodiments of the present invention will be described below with reference to the drawings. The elements that are common throughout the drawings have the same symbols, and redundant description thereof will be omitted.

First Embodiment

System Configuration

Figure 1:
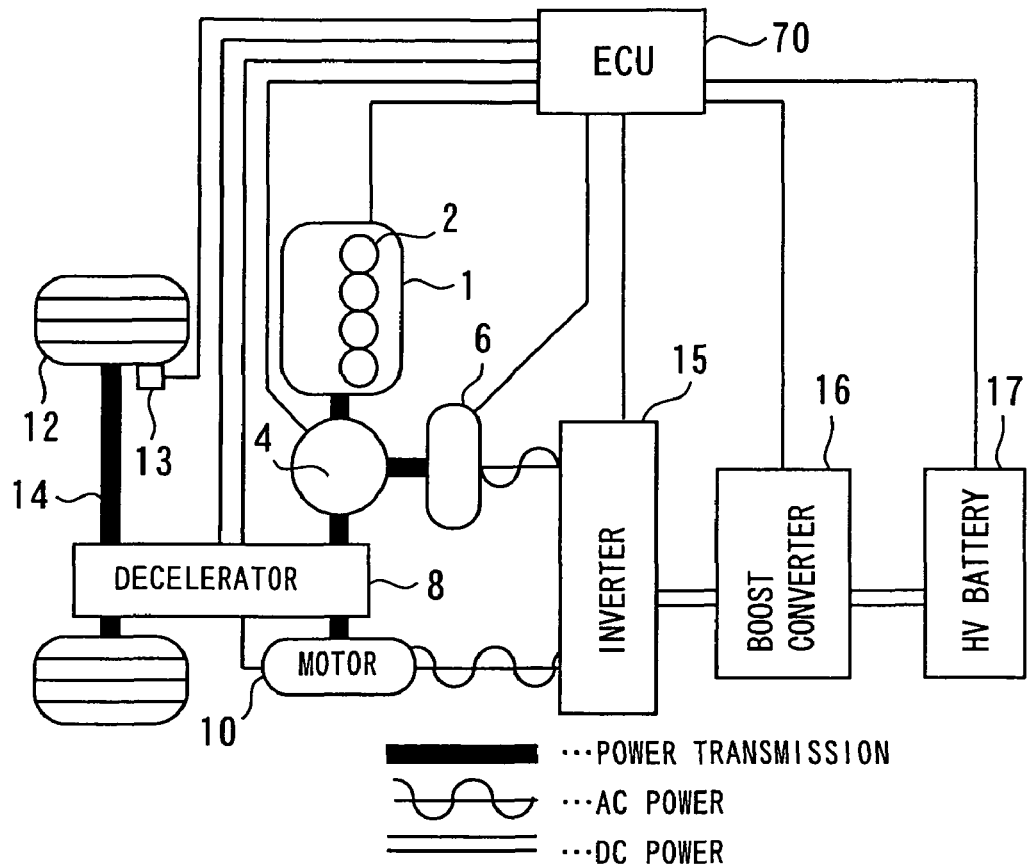
FIG. 1 is a schematic diagram illustrating a configuration of the system according to a first embodiment of the present invention.

FIG. 1 is a schematic diagram illustrating a configuration of a system according to a first embodiment of the present invention. The system according to the first embodiment is a hybrid vehicle.

The hybrid vehicle shown in FIG. 1 includes an engine 1 as a drive source. The engine 1 has a plurality of cylinders 2. As shown in FIG. 1, the engine 1 is, for example, an inline four-cylinder gasoline engine.

The hybrid vehicle of the first embodiment includes a three shaft-type power distribution mechanism 4. The power distribution mechanism 4 is a planetary gear mechanism, which will be described later. The power distribution mechanism 4 is connected to not only the engine 1 but also a motor/generator (hereinafter referred to as "generator") 6 and a motor/generator (hereinafter referred to as "motor") 10 as other drive sources. The power distribution mechanism 4 is also connected to a decelerator 8. The decelerator 8 is then connected to a rotating shaft 14 of wheels 12. The wheels 12 are provided with a wheel speed sensor 13. The wheel speed sensor 13 detects the speed or rotation speed of the wheels 12.

The generator 6 and the motor 10 are connected to a common inverter 15. The inverter 15 is connected to a boost converter 16, which is then connected to a battery 17. The boost converter 16 converts the voltage of the battery 17 (DC 201.6 V, for example) into a higher voltage (DC 500 V, for example). The inverter 15 converts the DC high voltage boosted by the boost converter 16 into an alternating voltage (AC 500 V, for example). The generator 6 and the motor 10 supply and receive electricity to and from the battery 17 via the inverter 15 and the boost converter 16.

The hybrid vehicle of this embodiment further includes an ECU (Electronic Control Unit) 70 as a control device. The ECU 70 is connected to the engine 1, the power distribution mechanism 4, the generator 6, the decelerator 8, the motor 10, the wheel speed sensor 13, the inverter 15, the boost converter 16, the battery 17 and the like. The ECU 70 controls the output or electricity generation of the generator 6 and the motor 10. The ECU 70 also acquires the state of charge (SOC) of the battery 17.

[Main Configuration of Drive Mechanism]

Figure 2:
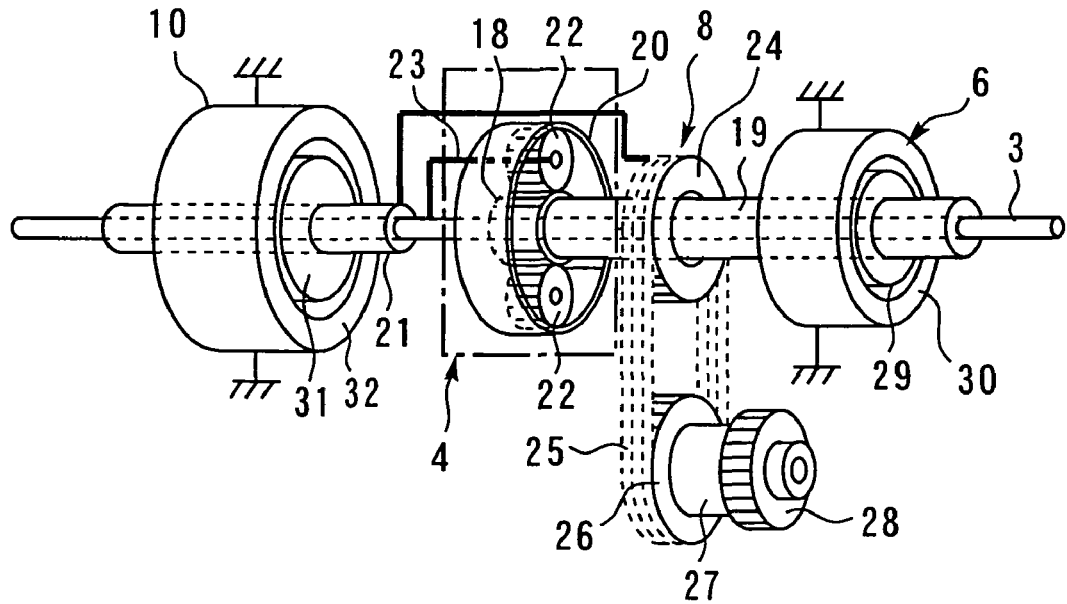
FIG. 2 is a perspective view showing a configuration of a main part of the drive mechanism in the hybrid vehicle shown in FIG. 1.

FIG. 2 is a perspective view showing a configuration of a main part of the drive mechanism in the hybrid vehicle shown in FIG. 1.

In FIG. 2, the power distribution mechanism 4 includes a sun gear 18, a ring gear 20, a plurality of pinion gears 22, and a carrier 23. The sun gear 18, which is an external gear, is fixed to a hollow sun gear shaft 19. A crankshaft 3 of the engine 1 passes through the hollow of the sun gear shaft 19. The ring gear 20, which is an internal gear, is disposed concentrically with the sun gear 18. The plurality of pinion gears 22 are disposed in such a way that they engage the sun gear 18 and the ring gear 20. The carrier 23 holds the plurality of pinion gears 22 in a rotatable manner. The carrier 23 is connected to the crankshaft 3. That is, the power distribution mechanism 4 is a planetary gear mechanism that provides a differential action by using the sun gear 18, the ring gear 20, and the pinion gears 22 as rotation elements.

The decelerator 8 has a power pickup gear 24 for picking up power. The power pickup gear 24 is connected to the ring gear 20 in the power distribution mechanism 4. The power pickup gear 24 is also connected to a power transmission gear 26 via a chain 25. The power transmission gear 26 is connected to a gear 28 via a rotating shaft 27. The gear 28 is connected to a differential gear (not shown) that rotates the rotating shaft 14 of the wheels 12.

The generator 6 has a rotor 29 and a stator 30. The rotor 29 is disposed on the sun gear shaft 19 that rotates integrally with the sun gear 18. The generator 6 can be driven not only as an electric motor that rotates the rotor 29 but also as a generator that uses the rotation of the rotor 29 to generate electromotive force.

The motor 10 has a rotor 31 and a stator 32. The rotor 31 is disposed on a ring gear shaft 21 that rotates integrally with the ring gear 20. The motor 10 can be driven not only as an electric motor that rotates the rotor 31 but also as a generator that uses the rotation of the rotor 31 to generate electromotive force.

The power distribution mechanism 4 can distribute the power of the engine 1 inputted from the carrier 23 to the sun gear 18 connected to the generator 6 and the ring gear 20 connected to the rotating shaft 14 according to the ratio of the sun gear 18 to the ring gear 20. Further, the power distribution mechanism 4 can integrate the power of the engine 1 inputted from the carrier 23 with the power of the generator 6 inputted from the sun gear 18, and output the integrated power to the ring gear 20. The power distribution mechanism 4 can also integrate the power of the generator 6 inputted from the sun gear 18 with the power inputted from the ring gear 20, and output the integrated power to the carrier 23.

[Configuration of Engine]

Figure 3:
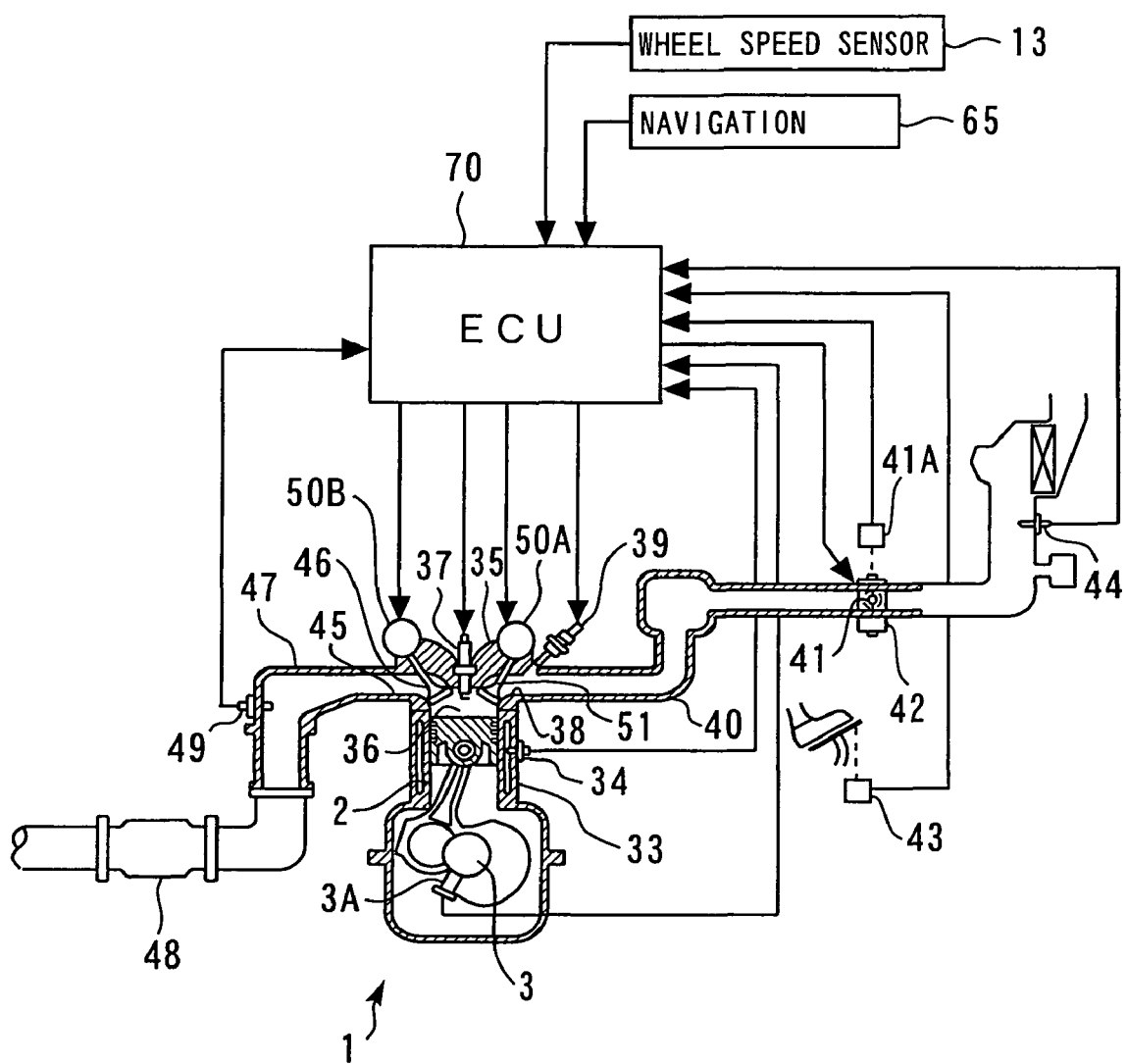
FIG. 3 is a diagram illustrating a configuration of the engine 1 shown in FIG. 1.

FIG. 3 is a diagram illustrating a configuration of the engine 1 shown in FIG. 1. The engine 1 includes a cylinder block 33 having pistons therein. The pistons are connected to the crankshaft 3 via a crank mechanism. A crank angle sensor 3A for detecting an angle of rotation of the crankshaft 3 is provided in the vicinity of the crankshaft 3. A cooling water temperature sensor 34 for detecting a temperature of cooling water is provided in the cylinder block 33.

A cylinder head 35 is assembled to an upper side of the cylinder block 33. An ignition plug 37 for igniting air-fuel mixture in each combustion chamber 36 is provided in the cylinder head 35.

The cylinder head 35 includes an intake port 38 that communicates with the combustion chamber 36. An intake valve 51 is provided at the portion where the intake port 38 is connected to the combustion chamber 36. The intake valve 51 is connected to a variable valve mechanism 50A that can change valve opening characteristics of the intake valve 51. An injector 39 for injecting fuel is provided in the vicinity of the intake port 38.

The intake port 38 is connected to an intake path 40. A throttle valve 41 is provided somewhere in the middle of the intake path 40. The throttle valve 41 is an electronically controlled valve driven by a throttle motor 42. The throttle valve 41 is driven based on the accelerator opening AA detected by an accelerator opening sensor 43. A throttle opening sensor 41A for detecting the throttle opening TA is provided in the vicinity of the throttle valve 41. An air flow meter 44 is provided upstream of the throttle valve 41. The air flow meter 44 detects the intake air mount Ga.

The cylinder head 35 also includes an exhaust port that communicates with the combustion chamber 36. An exhaust valve 46 is provided at the portion where the exhaust port 45 is connected to the combustion chamber 36. The exhaust port 45 is connected to an exhaust path 47. A catalyst 48 for cleaning the exhaust gas is provided in the exhaust path 47. An air-fuel ratio sensor 49 for detecting the exhaust air-fuel ratio is provided upstream of the catalyst 48.

The ignition plug 37, the injector 39, the throttle motor 42, the variable valve mechanism 50A and the like are connected to the output side of the ECU 70. The crank angle sensor 3A, the throttle opening sensor 41A, the accelerator opening sensor 43, the air flow meter 44, the air-fuel ratio sensor 49 and the like are connected to the input side of the ECU 70. The ECU 70 calculates speed of the engine based on the output of the crank angle sensor 3A.

The ECU 70 calculates output demand based on the rotation speed of the wheels 12 detected by the wheel speed sensor 13 and the accelerator opening AA detected by the accelerator opening sensor 43. To provide the output demand, the driving power is distributed among the engine 1, the generator 6, and the motor 8 in consideration of the SOC (state of charge) of the battery 17.

The ECU 70 uses the engine 1 to drive the vehicle during steady driving because the engine is operated quite efficiently during the steady driving. The ECU 70 controls the power distribution mechanism 4 to transmit one part of the power from the engine 1 to the wheels 12 via the decelerator 8 and transmit the other part of the power from the engine 1 to the generator 6. This causes the generator 6 to generate a small amount of electricity. The resultant electricity drives the motor 10, which then assists the engine 1 in terms of power. When the SOC in the battery 17 is lower than a reference value, the ECU 70 increases the output of the engine 1 to increase the amount of electricity generated by the generator 6. The generated electricity drives the motor 10 and charges the battery 17.

At the time of acceleration, the ECU 70 increases the power of the engine 1. Then, the ECU 70 controls the power distribution mechanism 4 to transmit the power of the engine 1 to the wheels 12 and the generator 6. The ECU 70 uses the electricity generated by the generator 6 and the electricity from the battery 17 to drive the motor 10, and transmits the power of the motor 10 to the wheels 12.

[Configuration of Variable Valve Mechanism]

Figure 4:
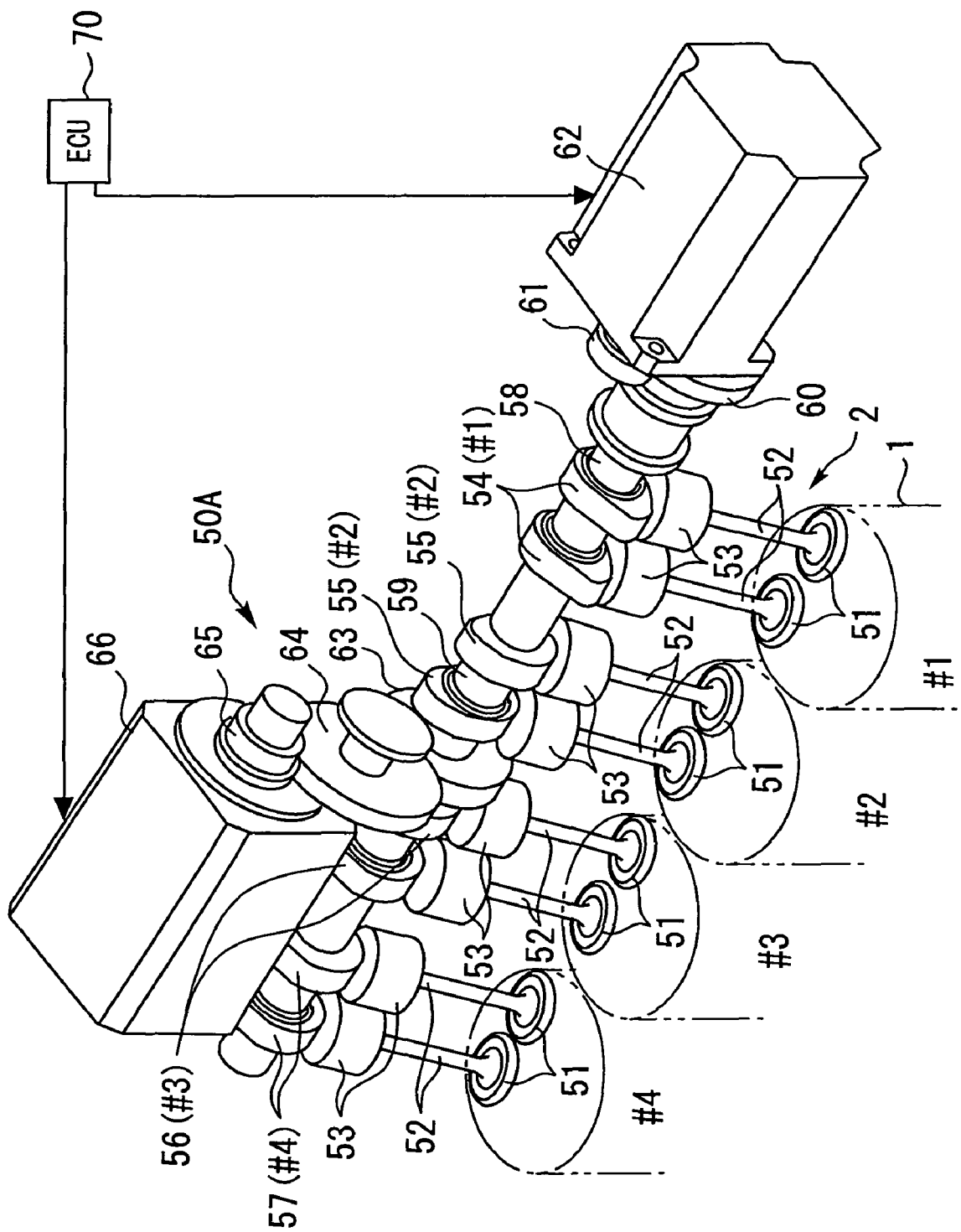
FIG. 4 is a perspective view showing a configuration of the variable valve mechanisms shown in FIG. 3.

FIG. 4 is a perspective view showing a configuration of the variable valve mechanism shown in FIG. 3. As described above, the variable valve mechanisms 50A and 50B are provided on the intake valve side and the exhaust valve side of the engine 1, respectively. FIG. 4 shows only the variable valve mechanism 50A on the intake valve side and omits the variable valve mechanism 50B on the exhaust valve side.

In FIG. 4, reference numbers #1 to #4 denote first to fourth cylinders of the engine 1. The combustion order in the engine 1 is the same as that in a typical engine: #1→#3→#4→#2.

The engine 1 includes two intake valves 51 for each of the cylinders. A valve shaft 52 is fixed to each of the intake valves 51. A valve lifter 53 is attached to the upper end of the valve shaft 52. Above each of the valve lifters 53, a corresponding cam 54, 55, 56, or 57 is disposed.

The cams 54 corresponding to the first cylinder #1 and the cams 57 corresponding to the fourth cylinder #4 are fixed to a first camshaft 58. The cams 55 corresponding to the second cylinder #2 and the cams 56 corresponding to the third cylinder #3 are fixed to a second camshaft 59. The camshafts 58 and 59 are coaxially disposed in a rotatable manner.

A first driven gear 60 is coaxially fixed to the first camshaft 58. The first driven gear 60 engages a first output gear 61. The first output gear 61 is fixed coaxially with the output shaft of a first motor 62. According to such a configuration, the torque of the first motor 62 can be transmitted to the first camshaft 58 via the gears 60 and 61.

On the other hand, a second driven gear 63 is coaxially fixed to the second camshaft 59. The second driven gear 63 engages a second output gear 65 via an intermediate gear 64. The second output gear 65 is fixed coaxially with the output shaft of a second motor 66. According to such a configuration, the torque of the second motor 66 can be transmitted to the second camshaft 59 via the gears 63, 64 and 65.

Figure 5:
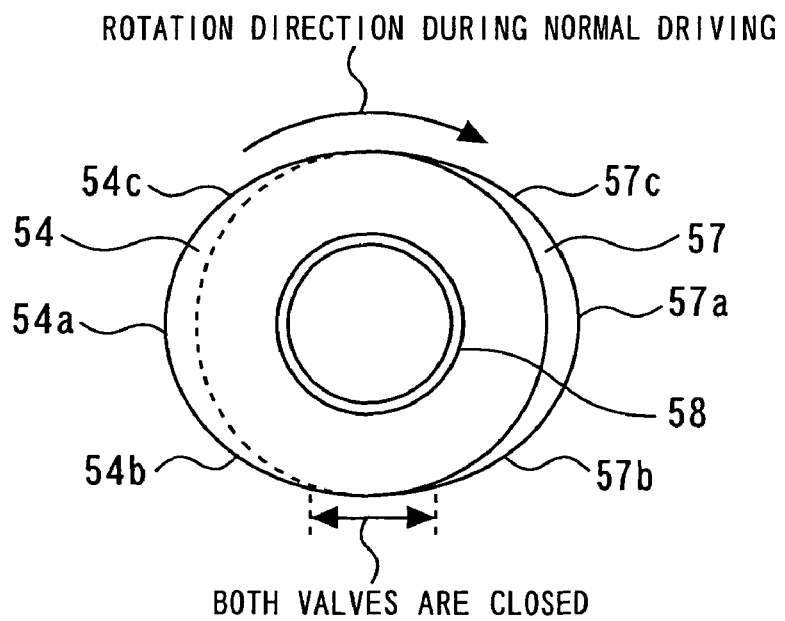
FIG. 5 is a diagram showing the first camshaft 58 shown in FIG. 4 and viewed from the axial direction thereof.

FIG. 5 is a diagram showing the first camshaft 58 shown in FIG. 4 and viewed from the axial direction thereof. As shown in FIG. 5, the two cams 54 and 57 provided on the first camshaft 58 are disposed in such a way that respective cam noses 54a and 57a are displaced by 180 degrees with respect to each other in the circumferential direction of the camshaft 58. The two cams 54 and 57 have the same cam shape, which is symmetric with respect to the line passing through the center of the cam and the cam nose.

Although not shown, the two cams 55 and 56 provided on the second camshaft 59 are also disposed in such a way that respective cam noses 55a and 56a are displaced by 180 degrees with respect to each other in the circumferential direction of the camshaft 59.

The operation of the variable valve mechanisms 50A and 50B is controlled by the ECU 70. The ECU 70 provides drive commands to the first and second motors 62 and 66 to control the rotation thereof based on the outputs of the various sensors.

Figure 6:
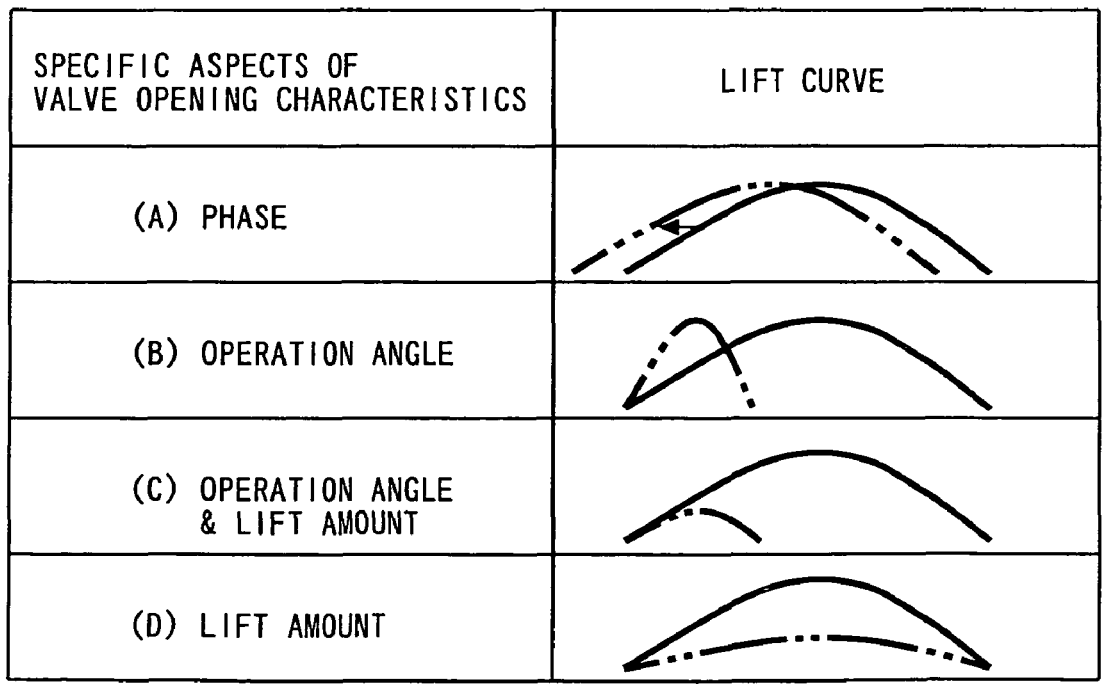
FIG. 6 is a diagram showing an example of the valve opening characteristics changed by the variable valve mechanism 50 shown in FIG. 4.

FIG. 6 is a diagram showing an example of the valve opening characteristics changed by the variable valve mechanism 50 shown in FIG. 4.

First, the change in "phase" shown in FIG. 6(A) will be described. When the first camshaft 58 is driven faster than the basic speed (that is, half the rotation speed of the crankshaft 3) during the period in which the intake valve 51 is closed, the phase of the camshaft 58 advances relative to that of the crankshaft 3, which advances the valve opening phase of the intake valve 51, as shown in FIG. 6(A).

The change in "operation angle" shown in FIG. 6(B) will be described. When the first camshaft 58 is driven faster than the basic speed during the period in which the intake valve 51 is open, and driven slower than the basic speed during the period in which the intake valve 51 is closed. Thus, the operation angle of the intake valve 51 becomes smaller as indicated by the chain double-dashed line in the figure. It is noted that the ratio of the rotation period of the camshaft 58 to the rotation period of the crankshaft 3 should not deviate from 2:1.

Conversely, when the first camshaft 58 is driven slower than the basic speed during the period in which the intake valve 51 is open, and driven faster than the basic speed during the period in which the intake valve 51 is closed. Thus, the operation angle of the intake valve 51 can be greater than the basic waveform as indicated by the solid line in the figure.

The change in "operation angle and lift amount" shown in FIG. 6(C) will be described. First, the first motor 62 is stopped in the course of the motion in which the camshaft 58 rotates in the normal direction and the opening-side ramp section 57b of the cam 57 for the fourth cylinder #4 pushes down the valve lifter 53. Thereafter, the rotation direction of the first motor 62 is then switched to rotate the camshaft 58 in the opposite direction. In these motor actions, the cam 57, which has two ramp sections 57b and 57c, swings with only the opening-side ramp section 57b being in contact with the valve lifter 53. The lift action of the valve for the fourth cylinder #4 follows the valve lift curve determined by the cam lift curve of the opening-side ramp section 57b of the cam 57. Further, when the camshaft 58 is rotated in the opposite direction, the closing-side ramp section 54b of the cam 54 for the first cylinder #1 pushes down the valve lifter 53. In the course of this action, the first motor 62 is stopped. Then, the rotation direction of the first motor 62 is switched again to rotate the camshaft 58 in the normal direction. The cam, which has two ramp sections, swings with only the closing-side ramp section 54b being in contact with the valve lifter 53. The lift action of the valve for the first cylinder #1 follows the valve lift curve determined by the cam lift curve of the closing-side ramp section 54b of the cam 54.

By successively carrying out the series of actions described above to periodically swing the cams 54 and 57, the lift amount of valve for the first and fourth cylinders #1 and #4 can be changed simultaneously. The lift amount of valve can be appropriately selected by changing the amount of swing of the cams 54 and 57 as appropriate.

Further, by appropriately adjusting the drive speed of the first motor 62 that swings the cams 54 and 57, only the "lift amount" can be changed without changing the operation angle, as shown in FIG. 6(D).

By thus alternately switching the rotation direction of the first motor 62 to periodically swing the cams 54 and 57, the opening-side ramp section 57b of the cam 57 opens and closes the valve for the fourth cylinder #4, and the closing-side ramp section 54b of the cam 54 opens and closes the valve for the first cylinder #1.

Features of First Embodiment

At the time of deceleration or low-load driving, fuel consumption can be improved by carrying out a fuel-cut (F/C) operation to stop the combustion in the engine 1 and by using the motor 10 to drive the vehicle. In this case, as shown in FIG. 7, the speed of the engine can be reduced to zero by controlling the speed of the generator 6 in consideration of the speed or the rotation speed of the wheels 12 (the vehicle speed).

Figure 7:
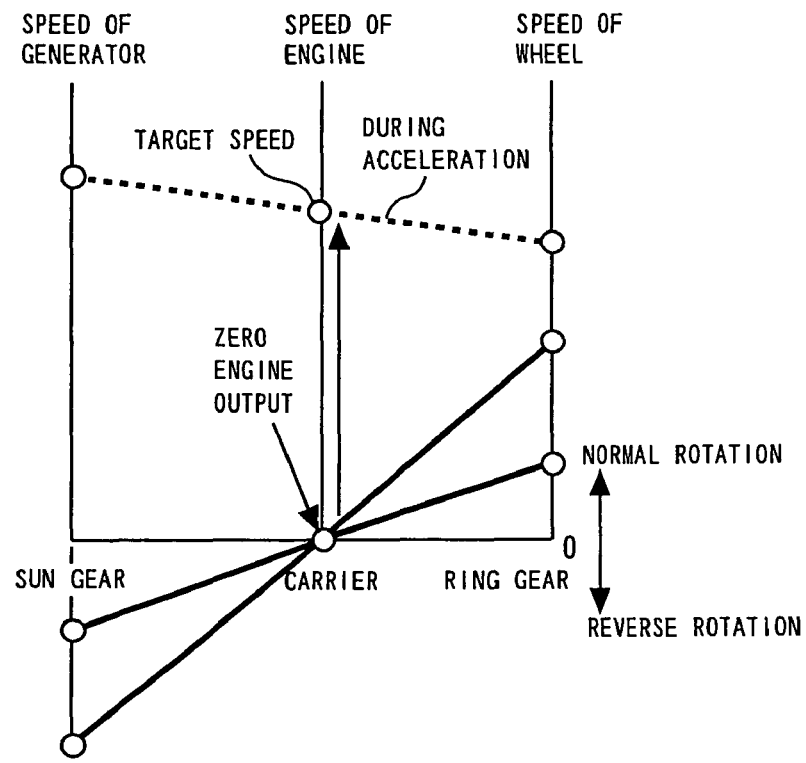
FIG. 7 is a collinear diagram showing movement of the power distribution mechanism when the speed of the engine is reduced to zero.

When an acceleration demand is then issued, however, it is necessary to raise the speed of the engine from zero to a target speed as indicated by the arrow in FIG. 7, so that the output of the engine will not rise quickly. Therefore, if the speed of the engine is zero during motor-based driving, the responsiveness to the acceleration demand becomes poor.

Figure 8:
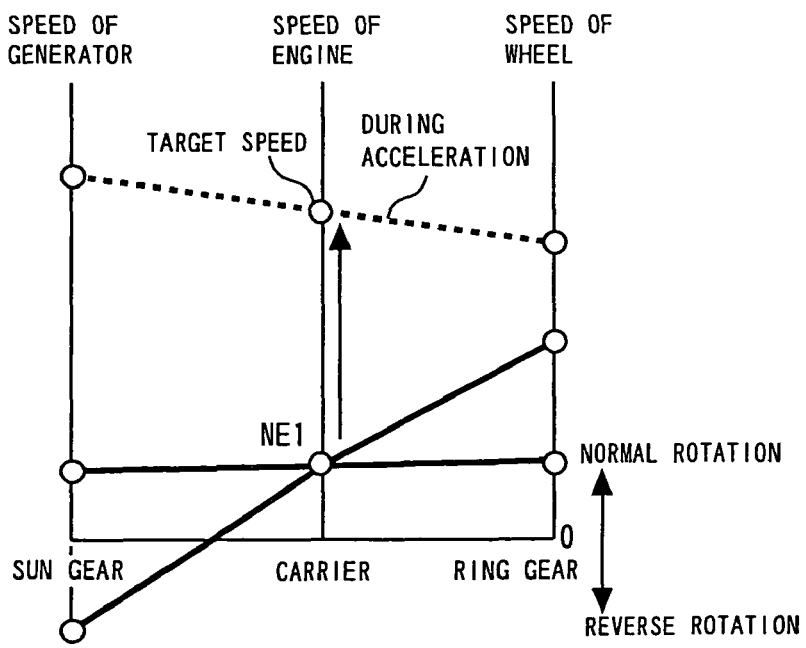
FIG. 8 is a diagram showing movement of the power distribution mechanism in the first embodiment.

To address this problem, in the first embodiment, the speed of the engine is kept at a predetermined speed NE1 when combustion is stopped in the engine 1 by controlling the speed of the generator 6 inputted to the sun gear in consideration of the speed of the wheels as shown in FIG. 8. That is, during the motor-based driving, which is the non-combustion period of the engine 1, the engine 1 is associatively rotated. Here, the predetermined speed NE1 is set to a value that is larger than idling speed and at which less friction is generated, 1000 rpm, for example. When an acceleration demand is issued, the speed of the engine can be raised quickly from the predetermined speed NE1 to the target speed, as indicated by the arrow shown in FIG. 8.

During the associative rotation as shown in FIG. 8, opening and closing the intake valve 51 and the exhaust valve 46 in a manner similar to the normal driving causes pumping loss. The pumping loss disadvantageously increases the amount of electricity used to drive the motor 10, resulting in increase in electricity consumption in the battery 17. To address this problem, in the first embodiment, the pumping loss is reduced during the associative rotation by holding the intake valve 51 and the exhaust valve 46 at their fully closed positions.

Figure 9:
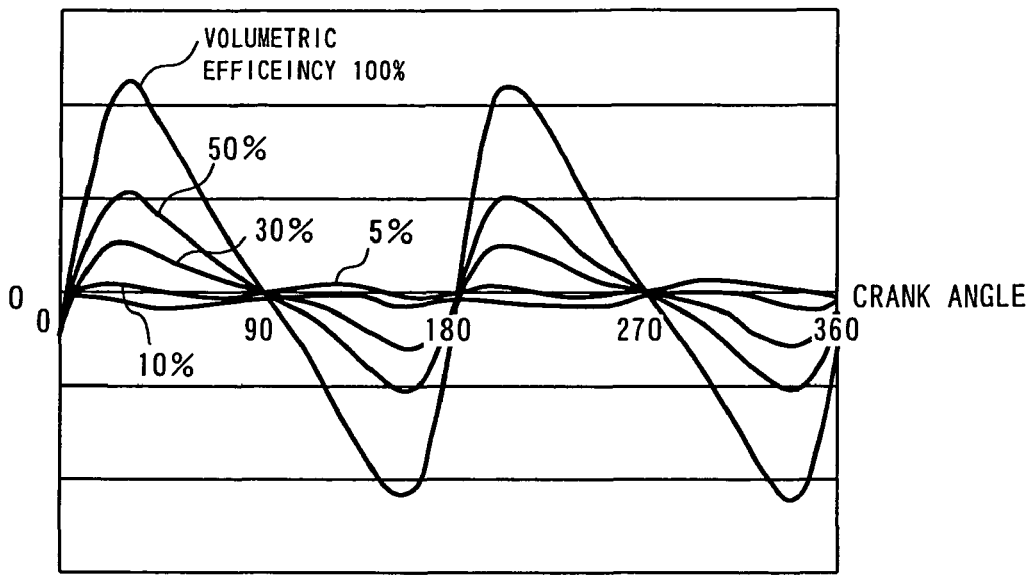
FIG. 9 is a collinear diagram showing the relationship between the volumetric efficiency and the compression torque variation.

When volumetric efficiency is high, variation in torque in the compression process (hereinafter referred to as "compression torque variation") increases. FIG. 9 is a diagram showing the relationship between the volumetric efficiency and the compression torque variation. As shown in FIG. 9, the compression torque variation can be sufficiently reduced by lowering the volumetric efficiency to 10% or lower. In consideration of this fact, in the first embodiment, the compression torque variation is reduced by retarding the valve closing timing of the intake valve 51 to reduce the amount of intake air into the cylinder before stopping the operation of the intake valve 51 and the exhaust valve 46.

Figure 10:
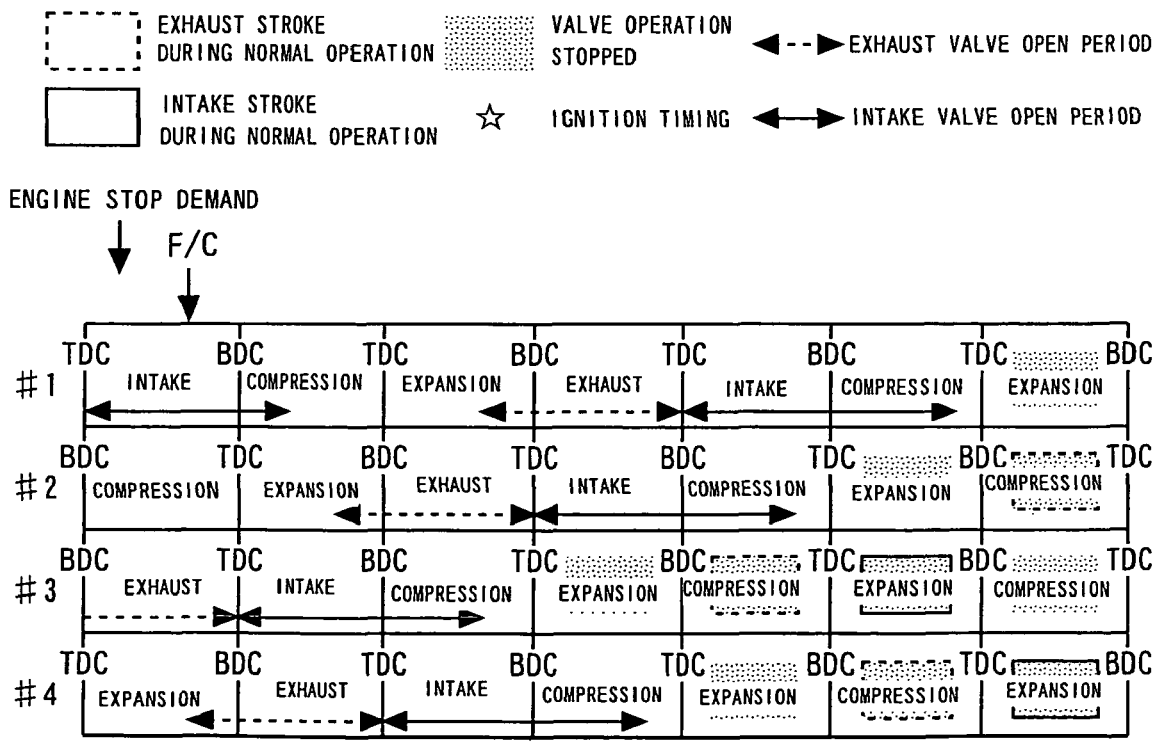
FIG. 10 is a diagram showing valve opening characteristic control of the intake and exhaust valves when combustion is stopped in the engine in the first embodiment.

FIG. 10 is a diagram showing valve opening characteristic control of the intake and exhaust valves when combustion is stopped in the engine in the first embodiment. In FIG. 10, reference numerals "#1" to "#4" denote the first to fourth cylinders of the engine 1, respectively. The combustion order is #1→#3→#4→#2 as describe above. Further, "intake" stands for the intake stroke, and "compression" for the compression stroke, "expansion" for the expansion stroke, and "exhaust" for the exhaust stroke.

In the example shown in FIG. 10, an engine stop demand is issued during the intake stroke of the first cylinder #1 based on the accelerator opening AA, the wheel speed and the like. The engine stop demand controls the speed of the generator 6, which in turn controls the engine in such a way that the speed thereof becomes the predetermined speed NE1 (see FIG. 8). Immediately after the engine stop demand has been issued, the fuel cut-off operation (F/C) is carried out for all the cylinders. In the first cylinder #1, since fuel has been injected before the F/C and the air-fuel mixture has been already sucked into the cylinder, ignition is carried out at a point close to the TDC after the compression stroke. For the cylinders other than the first cylinder, since no fuel has been injected before the F/C and no air-fuel mixture will be sucked into the cylinders after the F/C, ignition is inhibited.

To reduce the intake air mount into the cylinder, specifically to lower the volumetric efficiency to 10% or lower, the variable valve mechanism 50 retards the valve closing timing of the intake valve 51 for each of the cylinders. After the intake valve 51 has been closed, the intake valve 51 and the exhaust valve 46 are held at their fully closed positions. In the example shown in FIG. 10, the operation of the valves 51 and 46 is stopped in the order of the third cylinder #3→the fourth cylinder #4→the second cylinder #2→the first cylinder #1. For the first cylinder #1, the intake valve 51 is held at its fully closed position at the intake timing after the ignition. In this way, the compression torque variation can be sufficiently reduced, and the pumping loss can be reduced. After the operation of the intake valve 51 and the exhaust valve 46 has been stopped, the exhaust stroke during normal operation becomes the compression stroke, and the intake stroke during normal operation becomes the expansion stroke.

Figure 11:
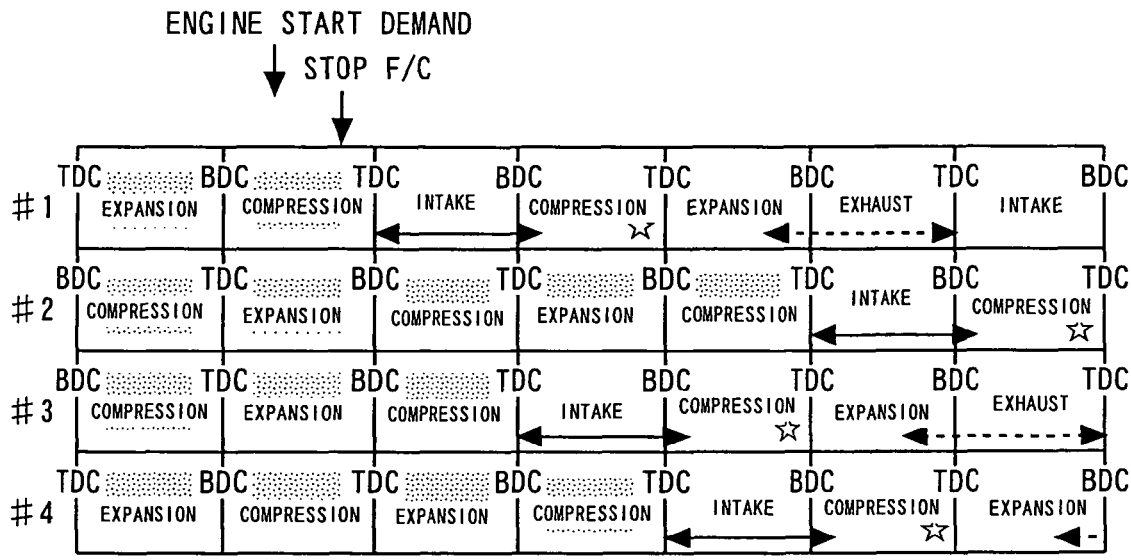
FIG. 11 is a diagram showing valve opening characteristic control of the intake and exhaust valves at the time of restart in the first embodiment.

FIG. 11 is a diagram showing valve opening characteristic control of the intake and exhaust valves at the time of restart in the first embodiment. In the example shown in FIG. 11, an engine start demand is issued during the compression stroke of the first cylinder #1 based on the accelerator opening AA, the wheel speed and the like. Immediately after the engine start demand has been issued, the fuel cut-off operation is stopped for all the cylinders. After the fuel cut-off operation has been stopped, in the first cylinder #1, the fuel is injected and the air-fuel mixture is sucked in the intake stroke. In this operation, the variable valve mechanism 50 advances the valve closing timing of the intake valve 51, so that the amount of intake air-fuel mixture into the cylinder increases. Then, ignition is carried out. The ignition timing is advanced. In the example shown in FIG. 11, the valve closing timing of the intake valve 51 is retarded and the ignition timing is advanced in the order of the first cylinder #1→the third cylinder #3→the fourth cylinder #4→the second cylinder #2. The variable valve mechanism 50 having the two motors 62 and 66 can control the valve opening characteristics of the intake valve 51 at a higher response rate than that of a hydraulic variable valve mechanism.

Figure 12:
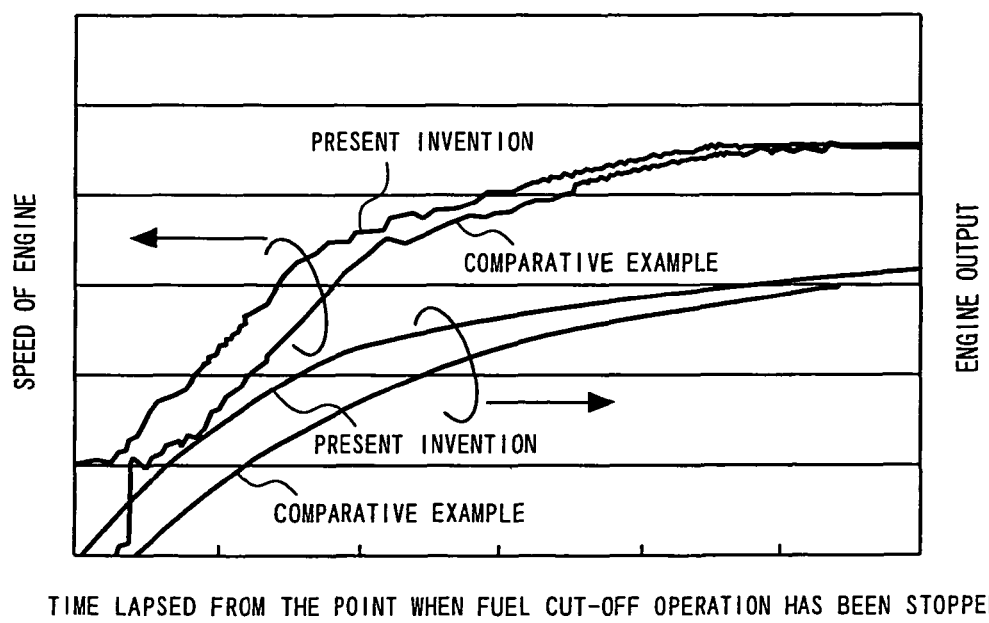
FIG. 12 is a diagram showing a rise of the engine speed and engine output at the time of restart in the first embodiment.

FIG. 12 is a diagram showing a rise of the engine speed and engine output at the time of restart in the first embodiment. FIG. 12 also shows a comparative example in which the engine is not associatively rotated, that is, the engine is restarted and the speed thereof is raised from zero.

As shown in FIG. 12, the speed of the engine can be quickly raised at the time of restart by associatively rotating the engine. Further, the variable valve mechanism 50 immediately changes the valve opening characteristics to those used at the time of restart. In this way, the engine output at the time of restart can be quickly raised, so that the acceleration response is improved.

Specific Processes in First Embodiment

Figure 13:
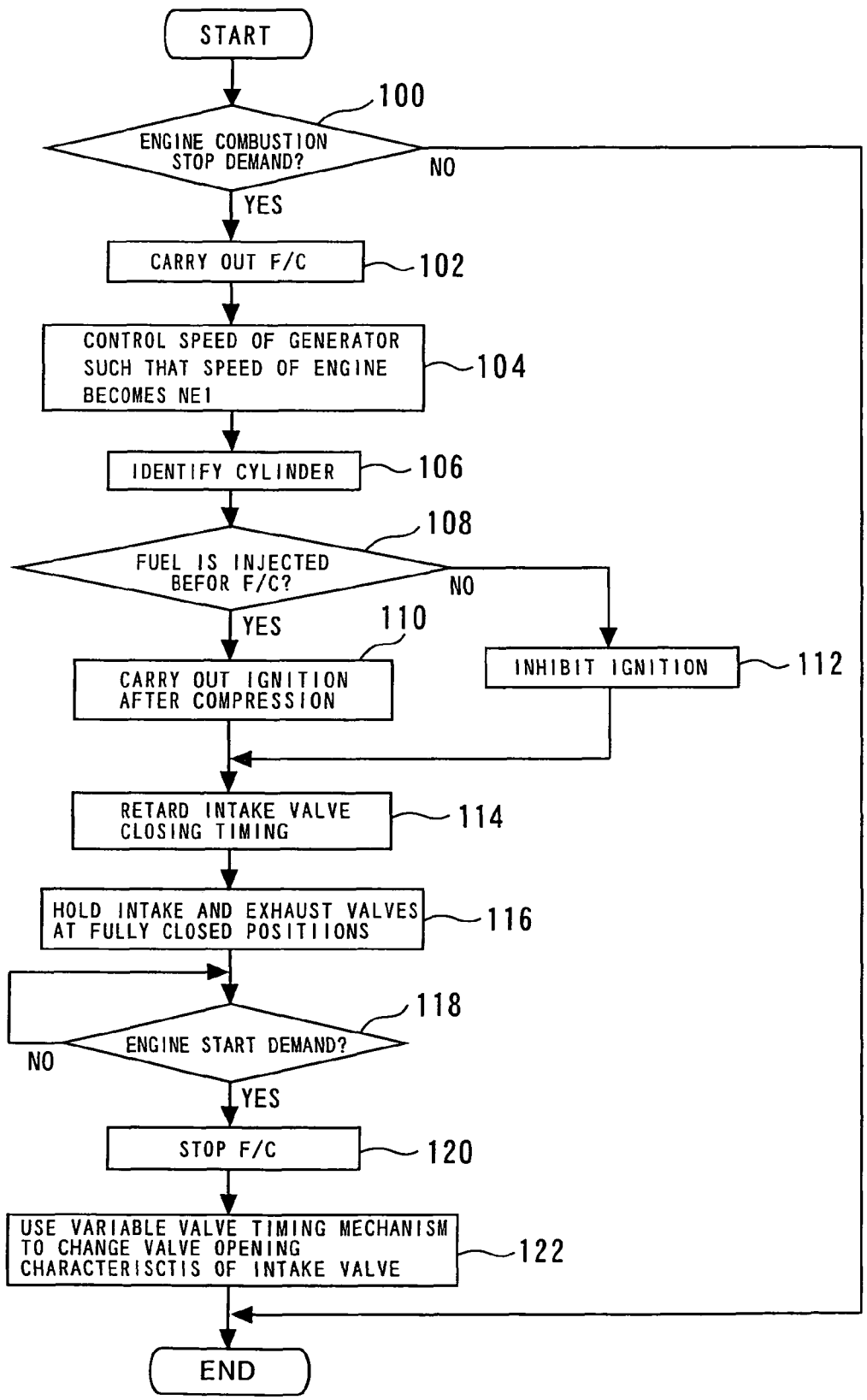
FIG. 13 is a flowchart showing a routine executed by the ECU 70 in the first embodiment.

FIG. 13 is a flowchart showing a routine executed by the ECU 70 in the first embodiment.

According to the routine shown in FIG. 13, it is first judged whether or not the engine combustion stop demand is issued (step 100). In the step 100, it is judged whether or not the engine combustion stop demand is issued based on the accelerator opening AA and the wheel speed.

When it is judged that in the step 100 the engine combustion stop demand is not issued, the routine is terminated. On the other hand, when the engine combustion stop demand is issued, the fuel cut-off operation is carried out (step 102). Then, the engine is controlled in such a way that the speed thereof becomes the predetermined speed NE1 by controlling the speed of the generator 6 in consideration of the speed of the wheels (step 104). In this way, the motor 10 drives the wheels 12, and the engine 1 is associatively rotated.

Then, the cylinder is identified based on the crank angle (step 106). For the cylinder identified in the step 106, it is judged whether or not fuel has been injected before the fuel cut-off operation (step 108).

For the cylinder judged in the step 108 that fuel has been injected before the fuel cut-off operation (the first cylinder shown in FIG. 10, for example), ignition is carried out by using the ignition plug 37 after the compression stroke (step 110). On the other hand, for the cylinders judged in the step 108 that no fuel has been injected before the fuel cut-off operation (the second to fourth cylinders shown in FIG. 10, for example), the ignition using the ignition plug 37 is inhibited until the engine is restarted (step 112).

Then, the variable valve mechanism 50A retards the valve closing timing of the intake valve 51 for each of the cylinders (step 114). For each of the cylinders, after the intake valve 51 has been closed, the intake valve 51 and the exhaust valve 46 are held at their fully closed positions (step 116). The intake air mount into each of the cylinders is thus reduced.

Then, it is judged whether or not the engine start demand has been issued (step 118). In the step 118, it is judged whether or not the engine start demand has been issued based on the accelerator opening AA and the wheel speed.

When it is judged in the step 118 that the engine start demand has not been issued, the process returns to the step 118 again. That is, the engine is associatively rotated until it is judged that the engine start demand has been issued.

On the other hand, when it is judged in the step 118 that the engine start demand has been issued, the fuel cut-off operation is stopped (step 120). Then, the valve opening characteristics of the intake valve 51 for each of the cylinders are changed by using the variable valve mechanism 50A (step 122). In the step 122, the valve closing timing of the intake valve 51 is advanced to increase the amount of intake air-fuel mixture into the cylinder, for example, as shown in FIG. 11. Then, as shown in FIG. 11, ignition is carried out by using the ignition plug 37 at a point on the advance side of the TDC in the compression stroke. That is, after the engine start demand is issued, the intake and ignition operations are carried out in such a way that the engine output increases.

As described above, in the first embodiment, during the EV driving in which the combustion in the engine 1 is stopped and the motor 10 is used, the engine is controlled in such a way that the speed thereof becomes the predetermined speed NE1 by controlling the speed of the generator 6 according to the vehicle speed. That is, when combustion is stopped in the engine, the engine is associatively rotated. In this way, since the speed of the engine can quickly rise at the time of restart, the engine output quickly rises and hence the acceleration response can be improved.

Further, in the first embodiment, the intake valve 51 and the exhaust valve 46 are held closed during the associative rotation. The pumping loss can thus be reduced, and the electricity consumption in the battery 17 can be reduced.

Moreover, in the first embodiment, the compression torque variation can be reduced by reducing the air flow into the cylinder to lower the volumetric efficiency to 10% or lower before the operation of the valves 51 and 46 is stopped.

In the first embodiment, although the amount of air trapped in each of the cylinders 2 is reduced by retarding the valve closing timing of the intake valve 51 to a point close to the TDC, the amount of air may be reduced by using the variable valve mechanism 50A to advance the valve closing timing of the intake valve 51 to a point immediately before the BDC or by reducing the lift amount of the intake valve 51. In these cases as well, the compression torque variation can be reduced.

In the first embodiment, the engine 1 corresponds to the "engine" in the first aspect. The generator 6 corresponds to "another drive means" in the first aspect and the "generator" in the second invention. The variable valve mechanism 50 corresponds to the "variable valve mechanism" in the first aspect. The intake valve 51 corresponds to the "intake valve" in the first aspect. The exhaust valve 46 corresponds to the "exhaust valve" in the first aspect. The wheels 12 correspond to the "wheels" in the second aspect.

In the first embodiment, the "engine rotation control means" in the first and second aspects is achieved by causing the ECU 70 to carry out the process in the step 104. The "variable valve mechanisms control means" in the third aspect is achieved by causing the ECU 70 to carry out the process in the step 114. The "variable valve mechanisms control means" in the first aspect is achieved by causing the ECU 70 to carry out the process in the step 116. The "combustion start control means" in the first aspect is achieved by causing the ECU 70 to carry out the processes in the steps 118, 120 and 122.

Second Embodiment

A second embodiment of the present invention will be described with reference to FIG. 14. The system of the second embodiment can be achieved by using the hardware configuration shown in FIGS. 1 to 5 and causing the ECU 70 to carry out a routine shown in FIG. 14, which will be described later.

In the first embodiment, when the engine combustion stop demand is issued, the motor 10 is used for driving and the engine 1 is always associatively rotated.

When the engine is always associatively rotated during the EV driving before restart, the electricity consumption in the battery increases, so that the fuel consumption disadvantageously may increase in some cases.

To address this problem, in the second embodiment, the necessity for the associative rotation of the engine is predicted, and the engine is associatively rotated only when the necessity is high.

Such necessity is predicted based on navigation information acquired from an on-vehicle navigation system. For example, when the vehicle drives on a climbing road or therearound, it is judged that the necessity for the associative rotation of the engine is high.

By thus choosing to either associatively rotate the engine or stop the engine according to the necessity for the associative rotation of the engine, it is possible to prevent excess associative rotation of the engine. In this way, the electricity consumption in the battery can be reduced, and the fuel consumption can be improved.

Specific Processes in Second Embodiment

Figure 14:
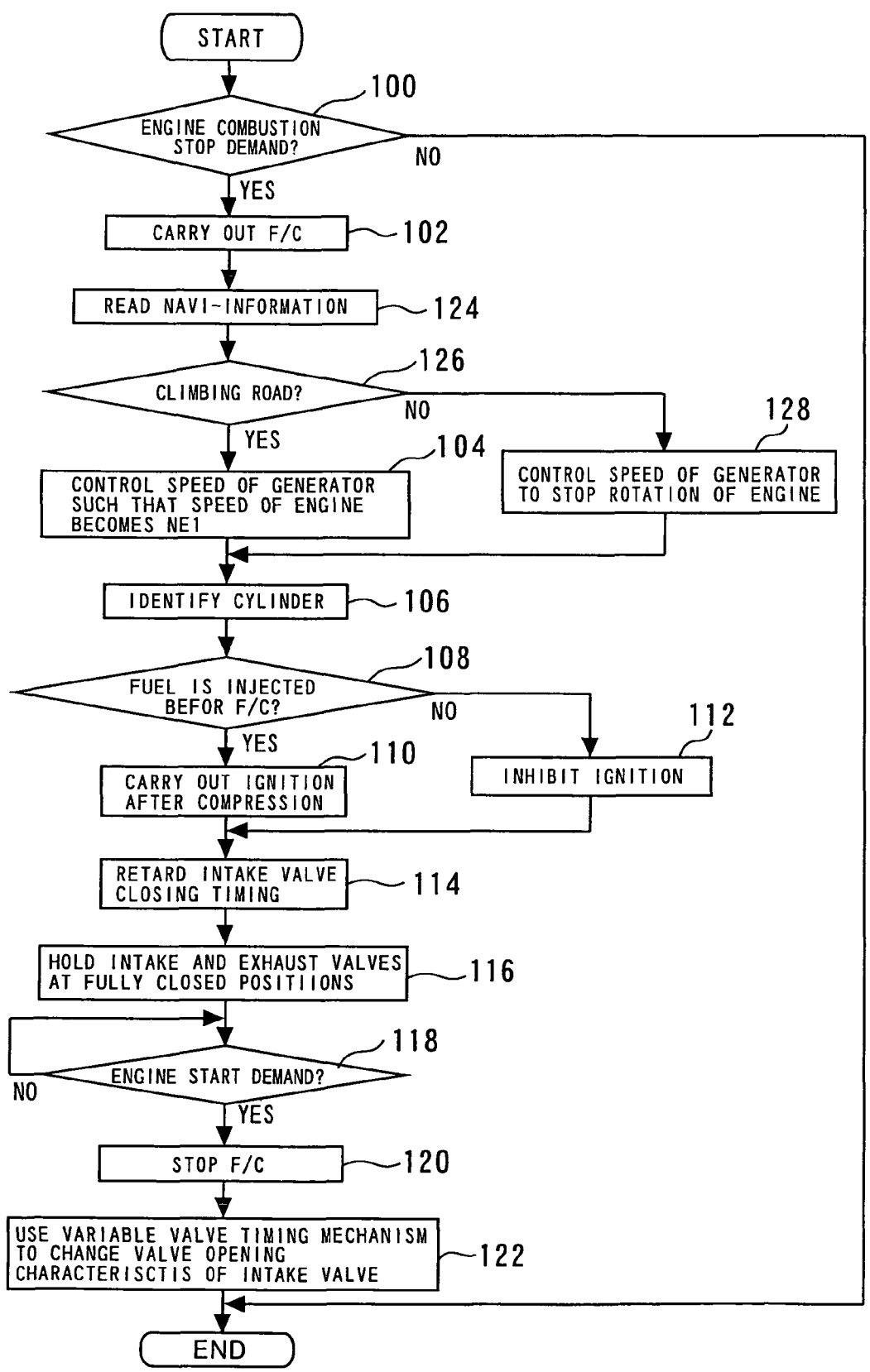
FIG. 14 is a flowchart showing a routine executed by the ECU 70 in the second embodiment.

FIG. 14 is a flowchart showing a routine executed by the ECU 70 in the second embodiment. The routine shown in FIG. 14 is similar to the routine shown in FIG. 13 except that the steps 124, 126, and 128 are further added thereto.

According to the routine shown in FIG. 14, after the fuel cut-off operation has been carried out in the step 102, navigation information (hereinafter referred to as "navi-information") is read from a navigation system 65 (step 124). Then, it is judged whether or not the vehicle is driving on a climbing road or therearound based on the navi-information read in the step 124 (step 126). In the step 126, it is judged whether or not good acceleration response is likely required when the engine is restarted. That is, the necessity for the associative rotation of the engine is predicted.

When it is judged in the step 126 that the vehicle is driving on a climbing road or therearound, it means that good acceleration response is likely required when the engine is restarted. That is, it is judged that the necessity for the associative rotation of the engine is high. In this case, the step 104 is carried out.

On the other hand, when it is judged in the step 126 that the vehicle is not driving on a climbing road or therearound, it means that good acceleration response is unlikely required when the engine is restarted. That is, it is judged that the necessity for the associative rotation of the engine is low. In this case, the speed of the generator 6 is controlled in such a way that the speed of the engine 1 becomes zero (step 128). Specifically, as in the case shown in FIG. 7, the engine is controlled in such a way that the speed thereof becomes zero by controlling the speed of the generator in consideration of the speed of the wheels. In the step 128, when good acceleration response is not required, that is, when the necessity for the associative rotation of the engine is low, the engine is not associatively rotated but the rotation of the engine is stopped, so that unnecessary electricity will not be consumed and the fuel consumption can be improved.

According to the second embodiment, the necessity for the associative rotation of the engine is predicted based on the navi-information, and the operation is switched between the associative engine rotation mode and the engine rotation stop mode according to the predicted necessity. It is thus possible to adequately balance the tradeoff between improvement in acceleration response and improvement in fuel consumption. Further, the necessity for the associative rotation of the engine can be accurately predicted based on the navi-information.

Variations of the second embodiment will be described below.
(First Variation)

In the second embodiment, although the operation is switched between the two steps 104 and 128 based on the navi-information, the switching may be carried out based on input information other than the navi-information.

Figure 15:
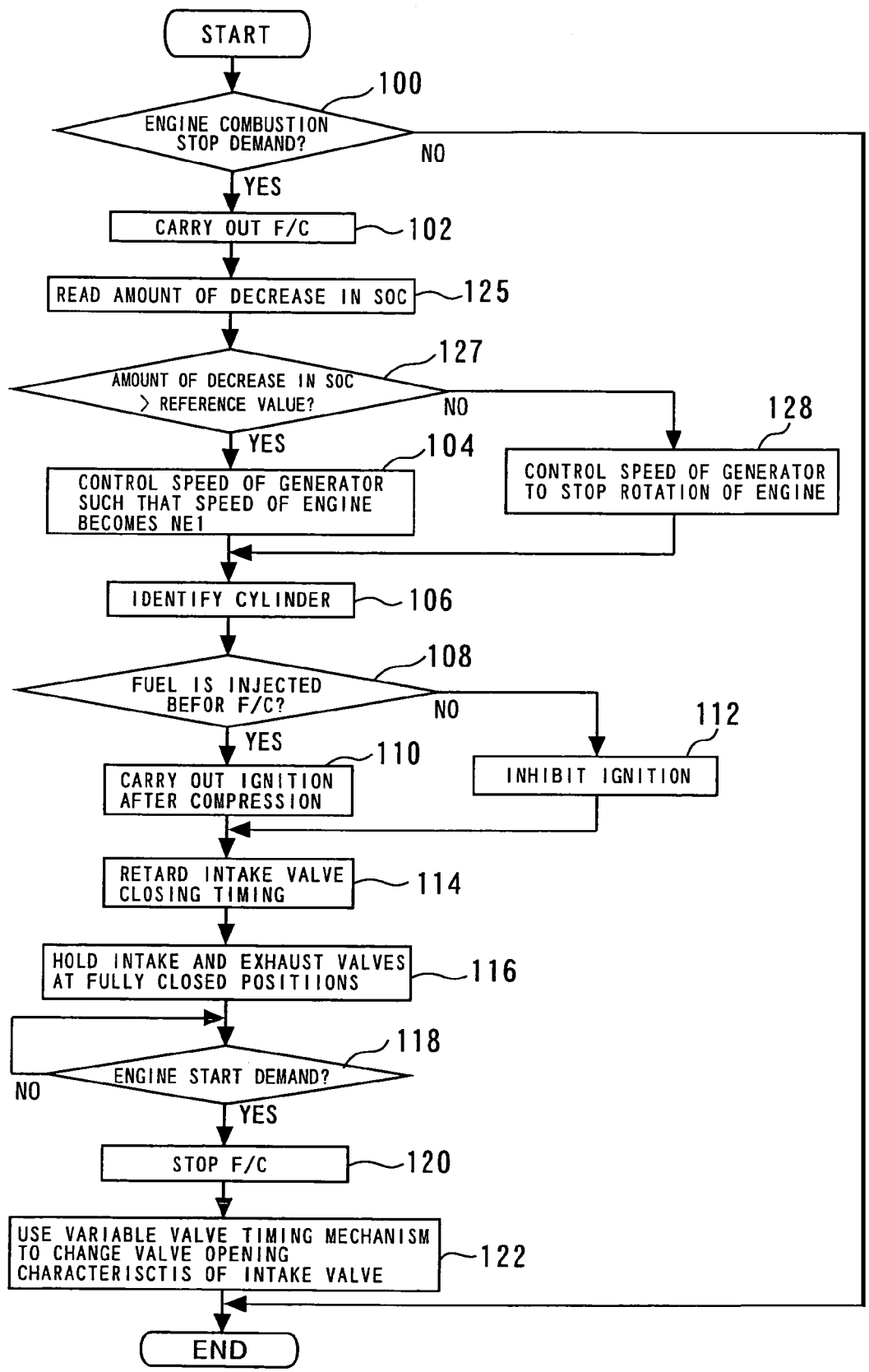
FIG. 15 is a flowchart showing a routine executed by the ECU 70 in a first variation of the second embodiment.

FIG. 15 is a flowchart showing a routine executed by the ECU 70 in a first variation of the second embodiment. The routine shown in FIG. 15 is similar to the routine shown in FIG. 14 except that the steps 124 and 126 are replaced with the steps 125 and 127.

In the routine shown in FIG. 15, the steps 100 and 102 in the routine shown in FIG. 14 are sequentially carried out. Then, the amount of change in SOC per unit time, that is, the amount of decrease in voltage of the battery 17, is calculated (step 125).

Then, it is judged whether or not the amount of change in SOC (the amount of decrease in battery voltage) calculated in the step 125 is greater than a reference value (step 127). In the step 127, it is judged whether or not the SOC will likely be smaller than or equal to a predetermined value.

When the SOC becomes smaller than or equal to a predetermined value, the ECU 70 starts the engine to charge the battery 17. To increase the charging efficiency, it is desirable to quickly increase the speed of the engine after the engine is started. To quickly increase the speed of the engine, it is effective to associatively rotate the engine before the engine is started. Therefore, in the step 127, the necessity for the associative rotation of the engine has been predicted based on the amount of change in SOC (the amount of decrease in battery voltage).

When it is judged in the step 127 that the amount of change in SOC is greater than the reference value, that is, when it is judged that the electricity consumption speed is high and the SOC will likely be smaller than or equal to the predetermined value, it means that the necessity for the associative rotation of the engine is high. In this case, the engine is associatively rotated (step 104).

On the other hand, when it is judged in the step 127 that the amount of change in SOC is smaller than or equal to the reference value, that is, when it is judged that the amount of decrease in battery voltage is large and the SOC will unlikely be smaller than or equal to the predetermined value, it means that the necessity for the associative rotation of the engine is low. In this case, the engine is stopped (step 128).

Then, the processes in the steps 106 to 122 in the routine shown in FIG. 14 are carried out.

According to the first variation, the necessity for the associative rotation of the engine is predicted based on the amount of change in SOC, and the operation is switched between the associative engine rotation mode and the engine rotation stop mode according to the predicted necessity. In this way, when the necessity for the associative rotation of the engine is low, the engine is not associatively rotated but the rotation of the engine is stopped, so that unnecessary electricity will not be consumed and the fuel consumption can be improved. Further, the necessity for the associative rotation of the engine can be accurately predicted based on the amount of change in SOC (the amount of decrease in battery voltage).

(Second Variation)

According to the second embodiment and the first variation thereof, the control is switched between the associative engine rotation mode and the engine rotation stop mode according to the predicted necessity for the associative rotation of the engine.

Some vehicle drivers place importance on acceleration response when the engine is restarted, while others place importance on fuel consumption.

In view of the above circumstances, in a second variation, the control is switched between the engine associative rotation mode and the engine rotation stop mode according to the vehicle driver's demand. Specifically, the control is switched between the associative engine rotation mode and the engine rotation stop mode based on the operation of a switch separately provided at the driver's seat in the vehicle.

Figure 16:
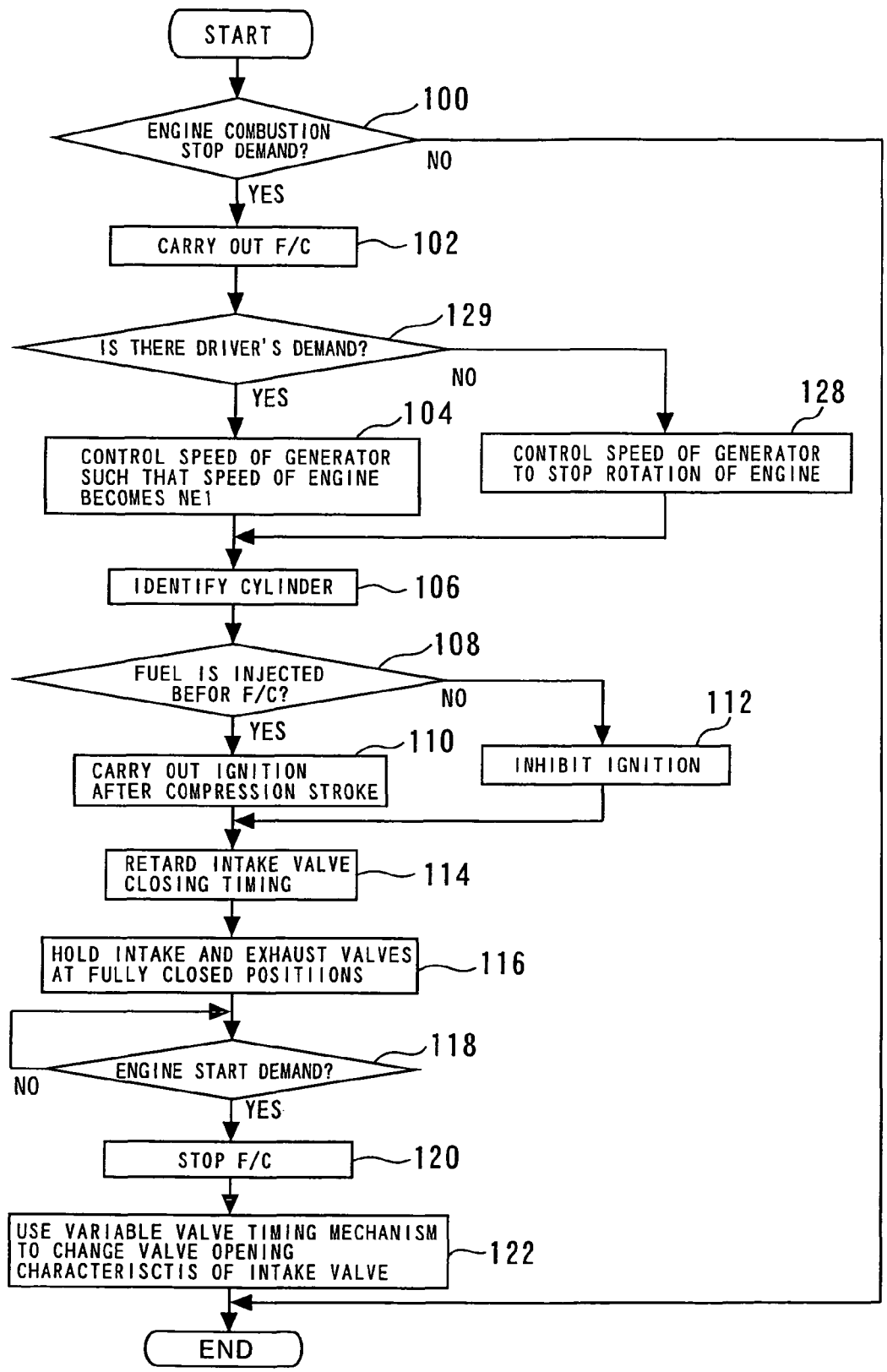
FIG. 16 is a flowchart showing a routine executed by the ECU 70 in the second variation of the second embodiment.

FIG. 16 is a flowchart showing a routine executed by the ECU 70 in the second variation of the second embodiment. The routine shown in FIG. 16 is similar to the routine shown in FIG. 14 except that the steps 124 and 126 are replaced with the step 129.

According to the routine shown in FIG. 16, the steps 100 and 102 in the routine shown in FIG. 14 are sequentially carried out. Then, it is judged whether or not the driver has demanded the associative rotation of the engine (step 129). When the switch has set to the associative engine rotation mode, it is judged in the step 129 that the driver has demanded the associative rotation of the engine. In this case, the engine is associatively rotated (step 104).

On the other hand, when the switch has set to the engine rotation stop mode, it is judged in the step 129 that the driver has not demanded the associative rotation of the engine. In this case, the rotation of the engine is stopped (step 128).

Then, the processes in the steps 106 to 122 in the routine shown in FIG. 14 are carried out.

According to the second variation, it is judged whether or not the demand for the associative rotation of the engine has been issued based on the driver's switch operation, and the control is switched between the associative engine rotation mode and the engine rotation stop mode according to the result of the judgment. It is thus possible to adequately balance the tradeoff between improvement in acceleration response and improvement in fuel consumption.

In the second variation, although it is judged whether or not the demand for the associative rotation of the engine has been issued based on the switch operation, it may be judged whether or not the demand for the associative rotation of the engine has been issued based on the amount of change in accelerator opening. For example, when the driver steps down the accelerator pedal immediately after it has been judged in the step 102 that the engine combustion stop demand has been issued, it will likely be judged that the engine start demand is issued in the later step 118. In this case, since the engine is associatively rotated before the engine is started, excellent acceleration response can be obtained when the engine is started.

Further, the concept of switching the control between the associative engine rotation mode and the engine rotation stop mode according to the necessity for the associative rotation of the engine or the driver's demand described above can be combined with other embodiments, which will be described later.

In the second embodiment and the variations thereof, the "necessity prediction means" and the "switching control means" in the eighth and ninth aspects are achieved by causing the ECU 70 to carry out the processes in the steps 124 and 126. The "necessity prediction means" and the "switching control means" in the eighth and tenth aspects are achieved by causing the ECU 70 to carry out the processes in the steps 125 and 127. The "driver's demand receiving means" and the "switching control means" in the eleventh aspect are achieved by causing the ECU 70 to carry out the process in the step 129.

Third Embodiment

System Configuration

In the first embodiment described above, the variable valve mechanisms 50A and 50B, each having two motors, are disposed on the intake valve side and the exhaust valve side, respectively.

In contrast, in a third embodiment of the present invention, the variable valve mechanism 50A having two motors is disposed on the intake valve side as in the first embodiment, whereas a variable valve mechanism 50C having only one motor is disposed on the exhaust valve side instead of the variable valve mechanism 50B. The configuration other than the above is the same as that in the first embodiment. Illustration of the entire system is thus omitted.

Figure 17:
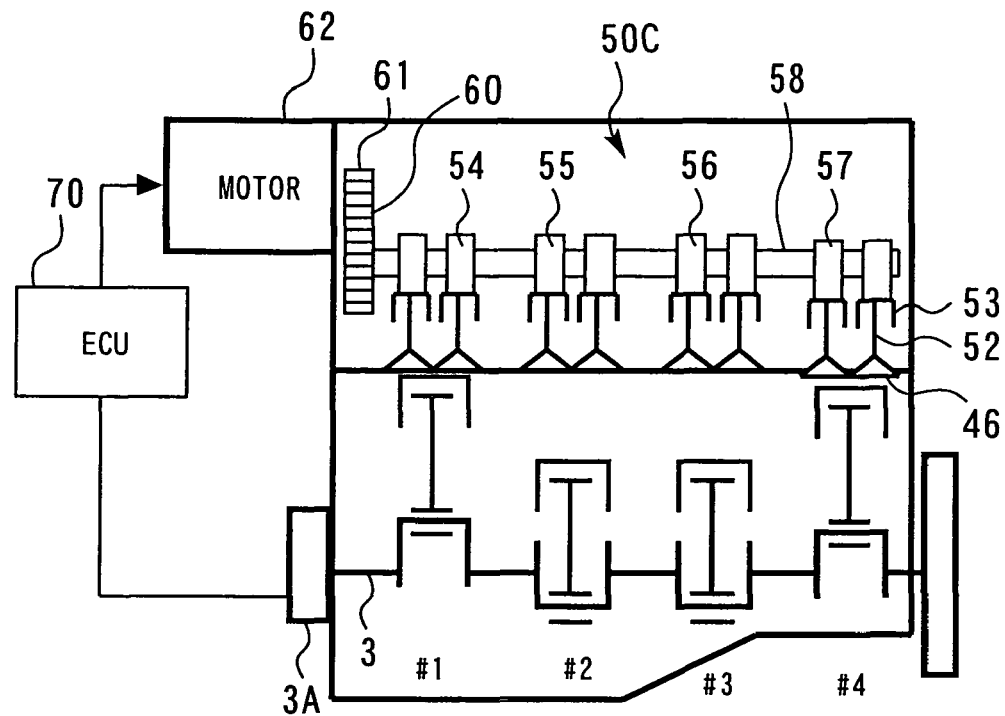
FIG. 17 is a schematic view showing the variable valve mechanism 50C disposed on the exhaust valve side in the third embodiment.

FIG. 17 is a schematic view showing the variable valve mechanism 50C disposed on the exhaust valve side in the third embodiment. As shown in FIG. 17, four exhaust cams 54, 55, 56, and 57 corresponding to the respective cylinders are fixed to the exhaust camshaft 58. A driven gear 60 is fixed to the exhaust camshaft 58. The driven gear 60 engages an output gear 61. The output gear 61 is fixed to the output shaft of a motor 62. According to such a configuration, the torque of the motor 62 can be transmitted to the exhaust camshaft 58 via the gears 60 and 61.

Figure 18:
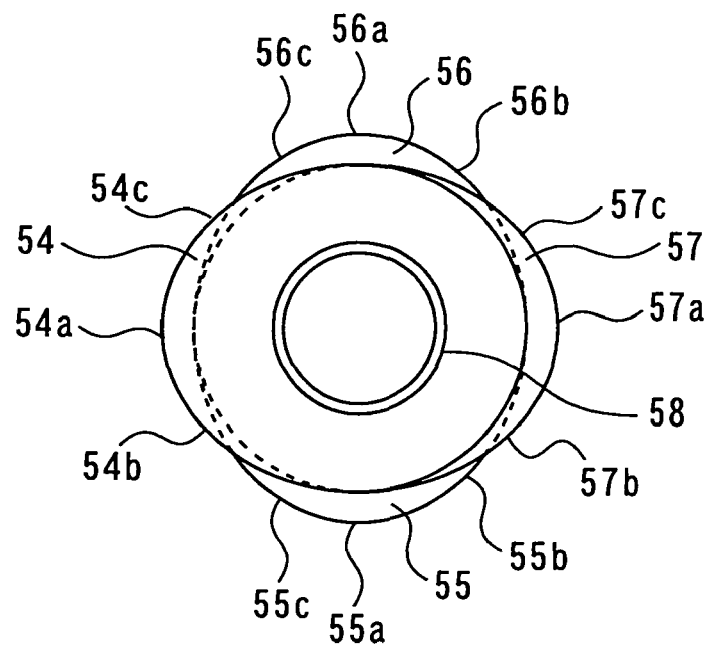
FIG. 18 is a diagram showing the exhaust camshaft shown in FIG. 17 and viewed from the axial direction thereof.

FIG. 18 is a diagram showing the exhaust camshaft shown in FIG. 17 and viewed from the axial direction thereof. As shown in FIG. 18, the cams 54, 55, 57, and 56 fixed to the camshaft 58 are disposed in such a way that respective cam noses 54a, 55a, 57a, and 56a are displaced by 90 degrees with respect to each other in the circumferential direction of the camshaft 58. The four cams have the same cam shape, which is symmetric with respect to the line passing through the center of the cam and the cam nose.

Features of Third Embodiment

In the third embodiment, by controlling the speed of the generator 6 when combustion is stopped in the engine 1, the engine is controlled in such a way a that the speed thereof becomes the predetermined speed of NE1, that is, the so-called associative rotation of the engine 1 is carried out, as in the first embodiment (see FIG. 8). Further, when the associative rotation is carried out, the operation of the intake and exhaust valves is stopped, as in the first embodiment.

Since the variable valve mechanism 50A on the intake valve side has two motors 62 and 66, the intake valves 51 can be simultaneously held closed for all the cylinders by driving and controlling the motors 62 and 66.

On the other hand, since the variable valve mechanism 50C has only one motor 62, the exhaust valves 46 cannot be simultaneously held closed for all the cylinders. Specifically, the use of the variable valve mechanism 50C leaves the exhaust valve 46 open for one or two cylinders. From the viewpoint of reducing the pumping loss, the number of exhaust valves held closed during the associative rotation is desirably minimized. To this end, in the third embodiment, during the associative rotation, the exhaust valve is held open for only one cylinder, whereas the exhaust valves are held closed for the other cylinders. In the third embodiment, the following description will be made with reference to the case where the exhaust valve is held open only for the fourth cylinder #4. Further, for the cylinders whose valves 51 and 46 are held closed, the operation of the valves 51 and 46 is stopped after the intake air mount into the cylinders is reduced to lower the volumetric efficiency to 10% or lower.

Figure 19:
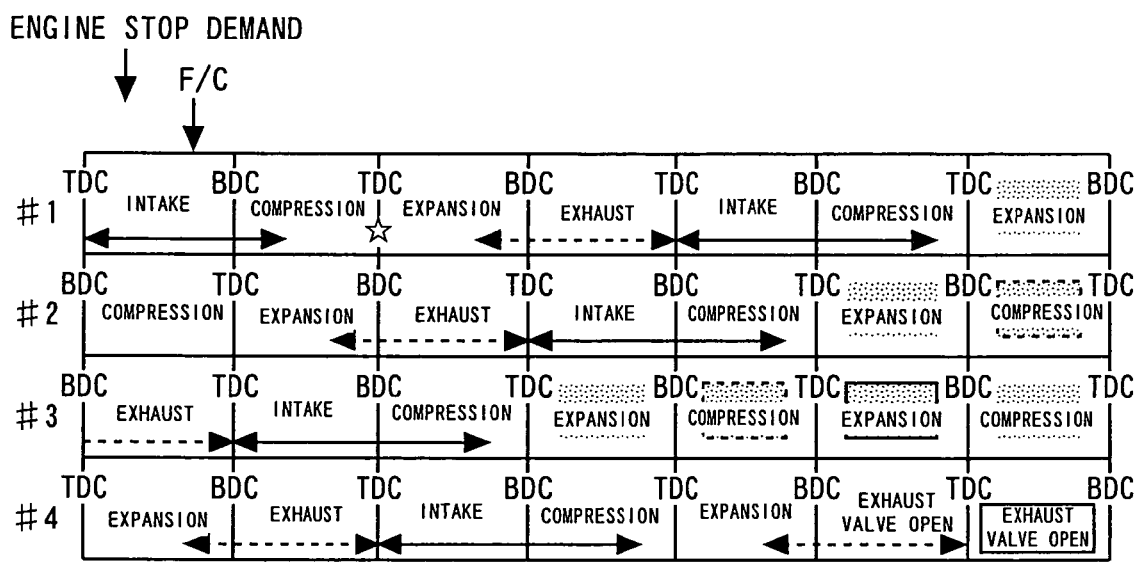
FIG. 19 is a diagram showing valve opening characteristic control of the intake and exhaust valves when combustion is stopped in the engine in the second embodiment.

FIG. 19 is a diagram showing valve opening characteristic control of the intake and exhaust valves when combustion is stopped in the engine in the third embodiment. In the example shown in FIG. 19, the engine stop demand is issued during the intake stroke of the first cylinder #1. The engine stop demand controls the speed of the generator, which in turn controls the engine in such a way that the speed thereof becomes the predetermined speed NE1. Immediately after the engine stop demand has been issued, the fuel cut-off operation is carried out for all the cylinders. In the first cylinder #1, since fuel has been injected before the fuel cut-off operation, ignition is carried out after the compression stroke.

As in the example shown in FIG. 10, for each of the third cylinder #3, the second cylinder #2, and the first cylinder #1, after the variable valve mechanism 50A retards the valve closing timing of the intake valve 51 to a point close to the TDC so as to reduce the intake air mount into the cylinder, the intake valve 51 and the exhaust valve 46 are held closed.

For the fourth cylinder #4, the intake valve 51 is held closed and the exhaust valve 46 is held open. In this action, the variable valve mechanism 50C holds the exhaust valve 46 for the fourth cylinder #4 at the maximum lift position. The pumping loss can thus be minimized.

Specific Processes in Third Embodiment

Figure 20:
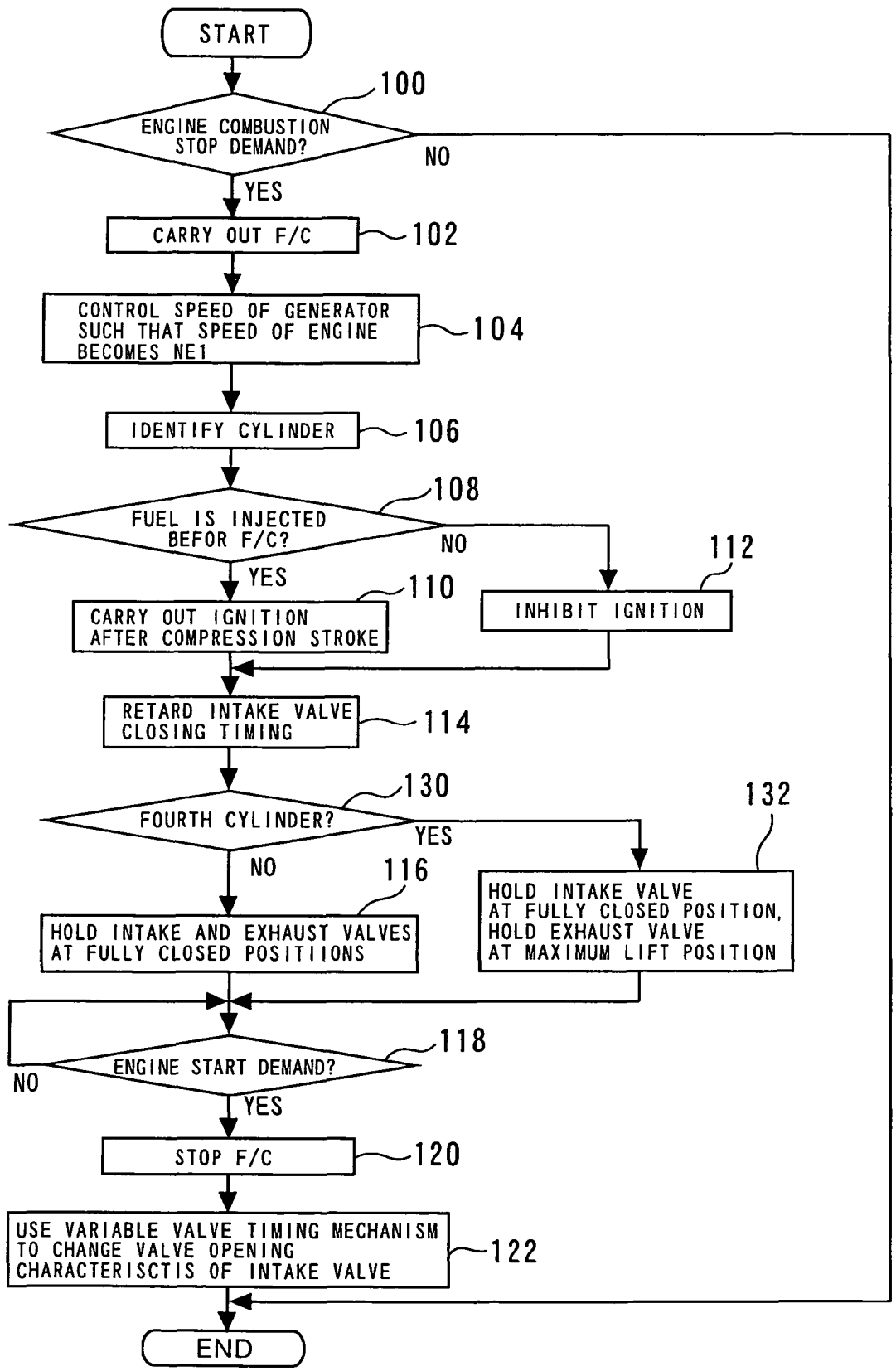
FIG. 20 is a flowchart showing a routine executed by the ECU 70 in the third embodiment.

FIG. 20 is a flowchart showing a routine executed by the ECU 70 in the third embodiment. The flow shown FIG. 20 is similar to that shown in FIG. 13 except that the steps 130 and 132 are further added thereto.

According to the routine shown in FIG. 20, the processes in the step 114 and the preceding steps are carried out in the same manner as the first embodiment. After the valve closing timing of the intake valve 51 is retarded, it is judged whether or not the identified cylinder is the fourth cylinder (step 130). When it is judged in the step 130 that the identified cylinder is not the fourth cylinder, the intake valve 51 and the exhaust valve 46 are held at their fully closed positions (step 116).

On the other hand, when it is judged in the step 130 that the identified cylinder is the fourth cylinder, the intake valve 51 is held at its fully closed position and the exhaust valve 46 is held at the maximum lift position (step 132). Then, the process in the step 118 is carried out as in the first embodiment.

As described above, in the third embodiment, during the EV driving in which the combustion in the engine 1 is stopped and the motor 10 is used (when the engine stop demand has been issued), the engine is controlled in such a way that the speed thereof becomes the predetermined speed NE1 by controlling the speed of the generator 6 according to the vehicle speed, as in the first embodiment. That is, when combustion is stopped in the engine, the engine is associatively rotated. The acceleration response at the time of restart can be thus improved.

Further, in the third embodiment, during the associative rotation, all the intake valves 51 are held closed, and the exhaust valves 46 for the cylinders except the fourth cylinder are held closed. Moreover, for each of the cylinders except the fourth cylinder, that is, the first to third cylinders, the valve closing timing of the intake valve 51 is retarded before the operation of the valves is stopped. This action reduces the intake air mount into each of the first to third cylinders, so that the compression torque variation can be reduced.

For the fourth cylinder, the pumping loss can be minimized by holding the exhaust valve 46 at the maximum lift position.

In the third embodiment, although the description has been made with reference to the case where the exhaust valve 46 is held open only for the fourth cylinder #4 during the associative rotation, the same advantageous effect as that in the third embodiment can be provided by holding the exhaust valve open for any of the other cylinders.

In the third embodiment, the "variable valve mechanisms control means" in the fourth and fifth aspects is achieved by causing the ECU 70 to carry out the processes in the steps 130 and 132. The "variable valve mechanisms control means" in the first aspect is achieved by causing the ECU 70 to carry out the process in the step 116. The "combustion start control means" in the first aspect is achieved by causing the ECU 70 to carry out the processes in the steps 118, 120, and 122.

Fourth Embodiment

A fourth embodiment of the present invention will be described with reference to FIGS. 21 to 23. The system of the fourth embodiment can be achieved by using the hardware configuration shown in FIGS. 1 to 5 and causing the ECU 70 to carry out a routine shown in FIG. 23, which will be described later.

Features of Fourth Embodiment

In the first embodiment described above, the compression torque variation is reduced by retarding the valve closing timing of the intake valve 51 before the intake valve 51 and the exhaust valve 46 are held closed so as to reduce the intake air mount into the cylinder.

For example, as in the case of cold restart, it may be desirable to provide excellent combustion performance at the time of restart in some cases. Further, at the time of restart, it may be desirable in some cases to more quickly raise the speed of the engine by carrying out ignition earlier.

To this end, in the fourth embodiment, the fuel cut-off operation is not carried out immediately after the engine stop demand has been issued, but the air-fuel mixture is sucked into the cylinder. Then, ignition is not carried out but the air-fuel mixture is trapped in the cylinder by holding the intake and exhaust valves closed. That is, the air-fuel mixture is held in the cylinder. The fuel cut-off operation is then carried out.

Figure 21:
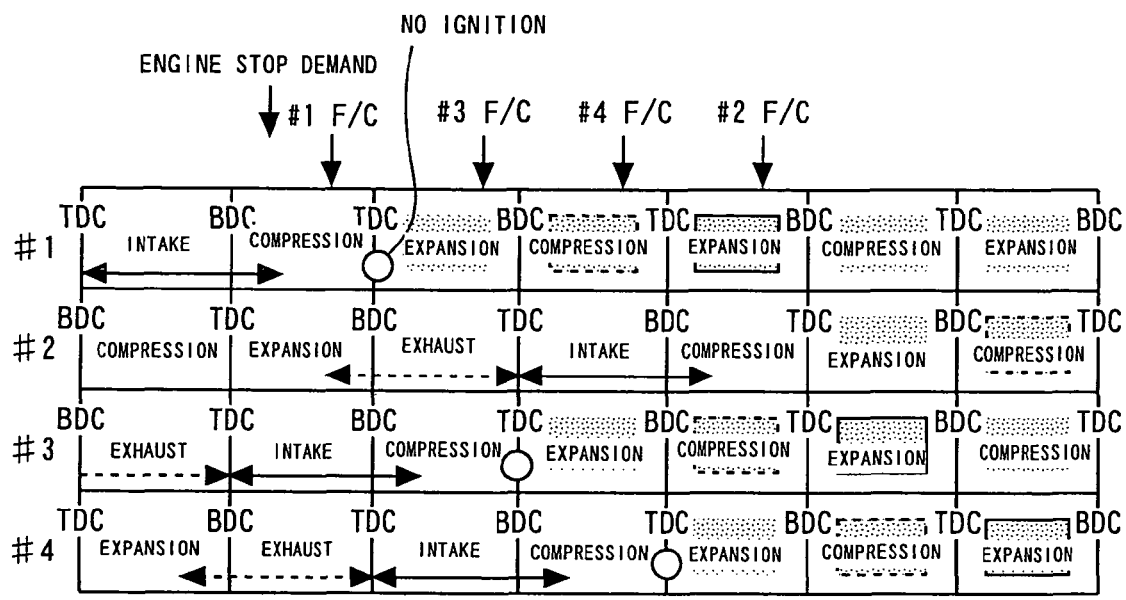
FIG. 21 is a diagram showing valve opening characteristic control of the intake and exhaust valves when combustion is stopped in the engine in the fourth embodiment.

FIG. 21 is a diagram showing valve opening characteristic control of the intake and exhaust valves when combustion is stopped in the engine in the fourth embodiment. In the example shown in FIG. 21, during the compression stroke of the first cylinder #1, the ECU 70 issues the engine stop demand based on the accelerator opening AA and the wheel speed. For the first cylinder #1, since fuel has been injected so that the air-fuel mixture has been sucked into the cylinder, the fuel cut-off operation is carried out after the intake valve 51 is closed. Then, the intake valve and the exhaust valve are held closed.

Unlike the first to third embodiments described above, retarding the timing of closing the intake valve 51 to lower the volumetric efficiency is not carried out. Further, unlike the first to third embodiments, ignition is not carried out when the first cylinder #1 has completed its compression stroke. That is, after the air-fuel mixture is sucked, ignition is inhibited. The air-fuel mixture is thus trapped in the cylinder.

On the other hand, for the cylinders other than the first cylinder #1, after the air-fuel mixture is sucked into the cylinders and the intake valves 51 are closed, the fuel cut-off operation is sequentially carried out. In the example shown in FIG. 21, the fuel cut-off operation is carried out in the order of the first cylinder #1 the third cylinder #3→the fourth cylinder #4→the second cylinder #2. Then, after the fuel cut-off operation has been carried out, the intake valve 51 and the exhaust valve 46 are held closed in each of the cylinders, and ignition is inhibited.

After the operation of the intake valve 51 and the exhaust valve 46 has been stopped, the exhaust stroke during normal operation becomes the compression stroke, and the intake stroke during normal operation becomes the expansion stroke. The compression stroke and the expansion stroke are repeated with the air-fuel mixture trapped in the cylinder. This action facilitates the atomization of the fuel because the air-fuel mixture in the cylinder is agitated and the temperature in the cylinder increases.

Figure 22:
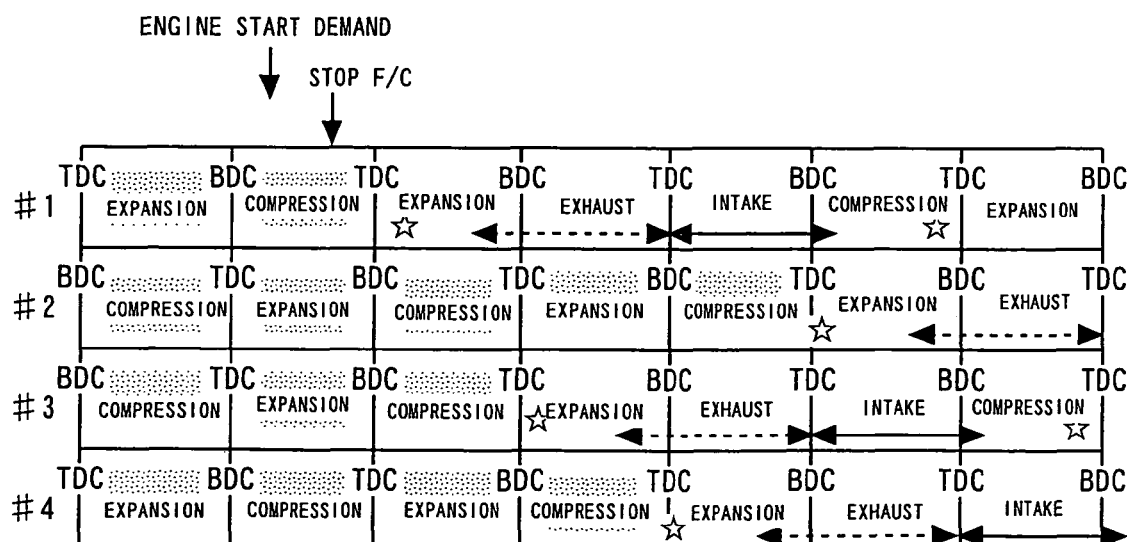
FIG. 22 is a diagram showing valve opening characteristic control of the intake and exhaust valves at the time of restart in the fourth embodiment.

FIG. 22 is a diagram showing valve opening characteristic control of the intake and exhaust valves at the time of restart in the fourth embodiment. In the example shown in FIG. 22, the engine start demand is issued during the compression stroke of the first cylinder #1. Immediately after the engine start demand has been issued, the fuel cut-off operation is stopped for all the cylinders. Although it is necessary in the first embodiment to suck the air-fuel mixture after the fuel cut-off operation is stopped, the air-fuel mixture has been already sucked into each of the cylinders in the fourth embodiment, so that ignition can be carried out at a point close to the TDC.

Specific Processes in Fourth Embodiment

Figure 23:
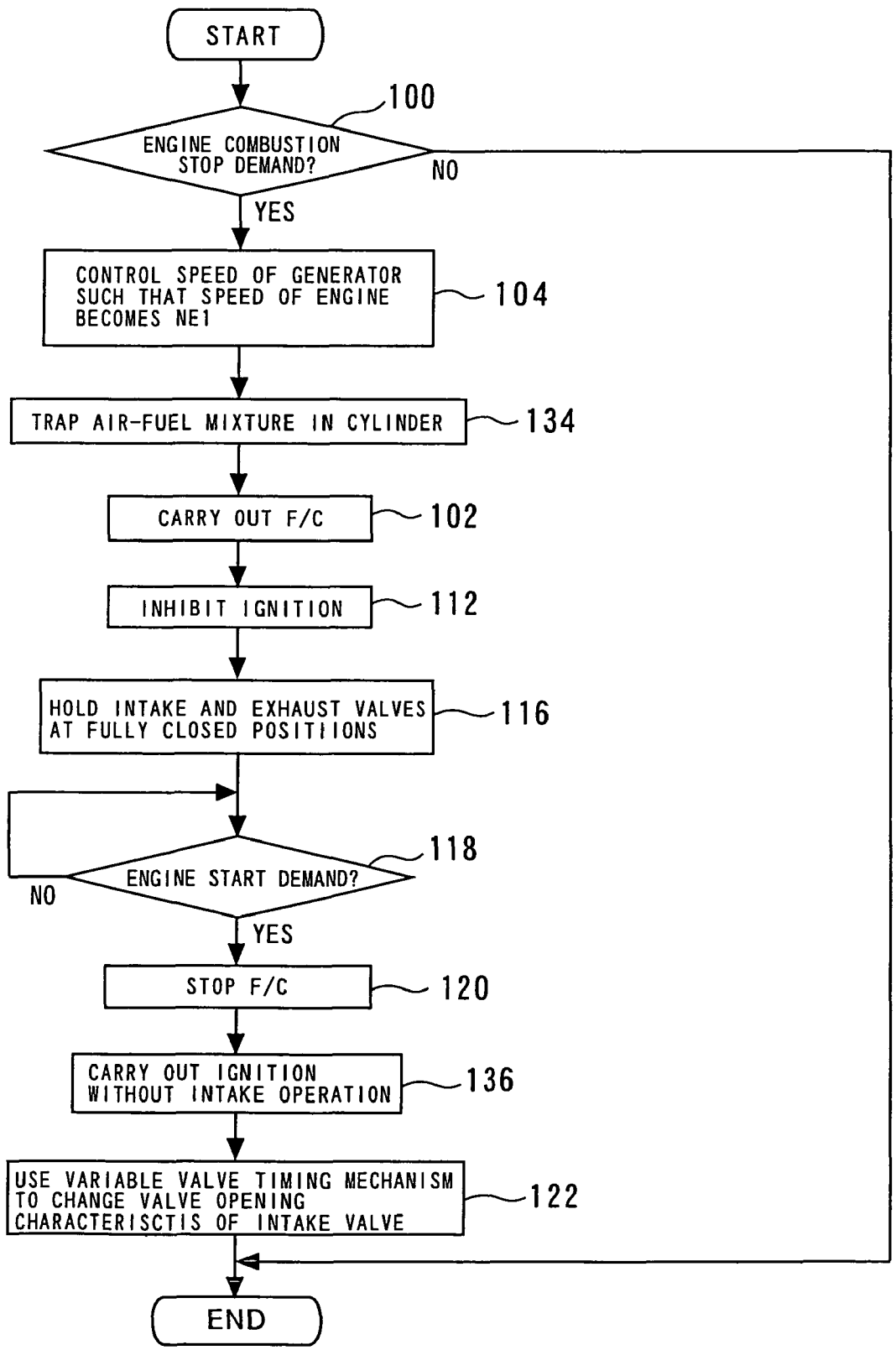
FIG. 23 is a flowchart showing a routine executed by the ECU 70 in the fourth embodiment.

FIG. 23 is a flowchart showing a routine executed by the ECU 70 in the fourth embodiment.

According to the routine shown in FIG. 23, it is judged whether or not the engine combustion stop demand has been issued (step 100), as in the first embodiment. When it is judged in the step 100 that the engine combustion stop demand has been issued, the engine is controlled in such a way that the speed thereof becomes the predetermined speed NE1 by controlling the speed of the generator 6 in consideration of the speed of the wheels (step 104). In this way, the motor 10 drives the wheels and the engine 1 is associatively rotated.

Then, by injecting fuel through the injector 39 and opening and closing the intake valve 51, the air-fuel mixture is trapped in each of the cylinders (step 134). The fuel cut-off operation is carried out for the cylinder that has trapped the air-fuel mixture (step 102). Igniting the air-fuel mixture is inhibited until the engine is restarted (step 112). Then, the intake valve 51 and the exhaust valve 46 are held at their fully closed positions (step 116). In this way, the engine is associatively rotated with the air-fuel mixture trapped in the cylinders.

Then, it is judged whether or not the engine start demand is issued (step 118). When it is judged in the step 118 that the engine start demand is issued, the fuel cut-off operation is stopped (step 120). Then, the air-fuel mixture trapped in each of the cylinders is ignited without any intake operation (step 136). The ignition is therefore carried out earlier than the first and second embodiments. Then, the valve opening characteristics of the intake valve 51 for each of the cylinders are changed by using the variable valve mechanism 50A (step 122).

As described above, in the fourth embodiment, when the engine combustion stop demand is issued, the air-fuel mixture is trapped in the cylinders, and then the fuel cut-off operation is carried out. The engine 1 is thus associatively rotated with the air-fuel mixture trapped in the cylinders. As a result, during the associative rotation of the engine 1, the air-fuel mixtures in the cylinders are agitated and the temperatures in the cylinders increase, thus facilitating the atomization of the fuel. Therefore, excellent ignition performance is provided even at the time of cold restart. Further, since the ignition can be carried out earlier than the first embodiment after the fuel cut-off operation is stopped, the acceleration response can be further improved.

In the fourth embodiment, the "air-fuel mixture holding means" in the sixth invention is achieved by causing the ECU 70 to carry out the process in the step 134. The "combustion start control means" in the sixth invention is achieved by causing the ECU 70 to carry out the process in the step 136.

[Variation]

In the fourth embodiment, although the description has been made with reference to the case where the intake and exhaust valves are held closed for all the cylinders, the exhaust valve 46 may be held open for one cylinder when the variable valve mechanism 50C is used as in the third embodiment.

Figure 24:
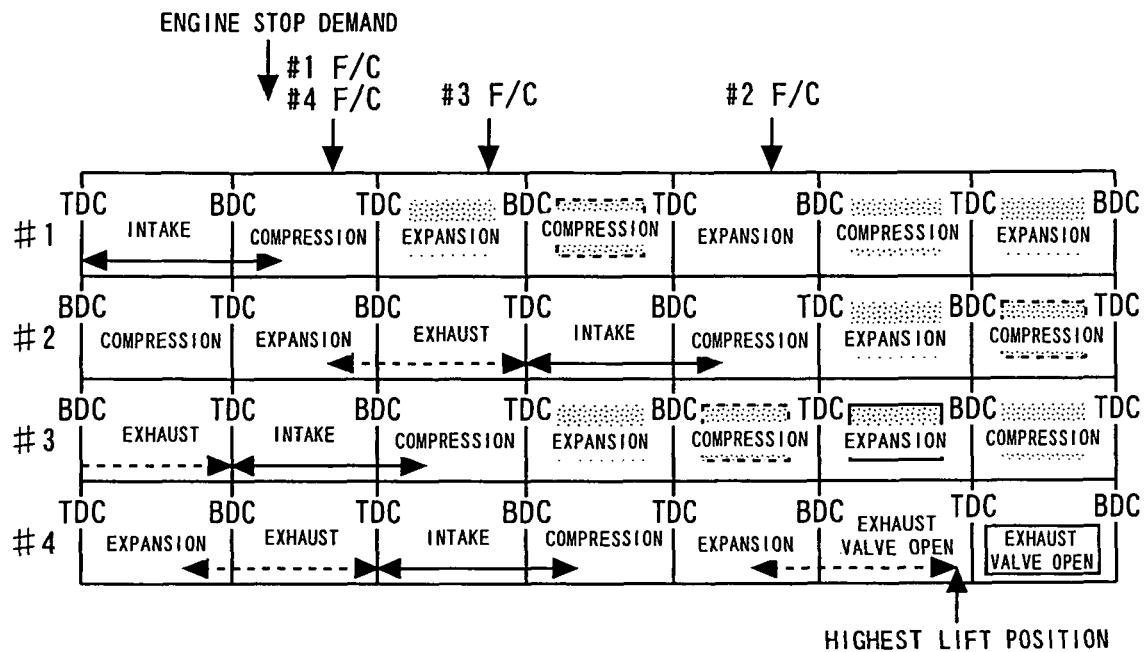
FIG. 24 is a diagram showing valve opening characteristic control of the intake and exhaust valves when combustion is stopped in the engine in a variation of the fourth embodiment.

FIG. 24 is a diagram showing valve opening characteristic control of the intake and exhaust valves when combustion is stopped in the engine in a variation of the fourth embodiment. In the variation shown in FIG. 24, as in the third embodiment, the exhaust valve 46 is held open only for the fourth cylinder #4 during the associative rotation.

In the example shown in FIG. 24, the engine stop demand is issued during the compression stroke of the first cylinder #1. Since the air-fuel mixture has been sucked into the first cylinder #1, the fuel cut-off operation is carried out after the intake valve 51 is closed. Unlike the fourth embodiment described above, the fuel cut-off operation is carried out for the fourth cylinder #4 as well, whose exhaust valve is held open after the engine stop demand has been issued, at the same timing as the first cylinder #1. In this variation, the fuel cut-off operation is therefore carried out in the order of the first cylinder #1 and the fourth cylinder #4→the third cylinder #3→the second cylinder #2. Although the air-fuel mixture cannot be trapped in the fourth cylinder #4, it is possible to prevent emission degradation by carrying out the fuel cut-off operation at the same timing as the engine stop demand. Further, the exhaust valve 46 for the fourth cylinder #4 is held at the maximum lift position. It is thus possible to minimize the pumping loss caused by holding the exhaust valve 46 open.

For each of the third cylinder #3 and the second cylinder #2, as in the fourth embodiment, after the intake valve 51 is closed, the fuel cut-off operation is carried out. Then, the intake valve 51 and the exhaust valve 46 are held closed.

Fifth Embodiment

Features of Fifth Embodiment

In the first embodiment, when the engine is restarted, the engine output is improved not only by using the variable valve mechanism 50A to advance the valve closing timing of the intake valve 51 but also by advancing the ignition timing.

At the time of restart, the accelerator opening AA is small, that is, the torque demand is small, in some cases. In the cases, advancing not only the valve closing timing of the intake valve 51 but also the ignition timing as in the first embodiment may significantly increase the output torque compared to the torque demand. As a result, there may be a large shock when the engine is restarted.

To address this problem, in the fifth embodiment, when the torque demand is low, the torque is not abruptly raised when the engine is restarted. Specifically, when the engine is restarted, for the first few cylinders, the valve closing timing of the intake valve 51 is not advanced but still retarded, and the ignition timing is not advanced but still retarded. For the following cylinders, the valve closing timing of the intake valve 51 is advanced by the variable valve mechanism 50A to increase the intake air mount and the ignition timing is advanced, so that the output torque becomes greater than those for the first few cylinders.

On the other hand, when the torque demand is high, there will very unlikely be a large shock when the engine is restarted. Therefore, the valve opening timing of the intake valve 51 is advanced to increase the intake air mount and the ignition timing is advanced, so that the engine output is increased.

Figure 25:
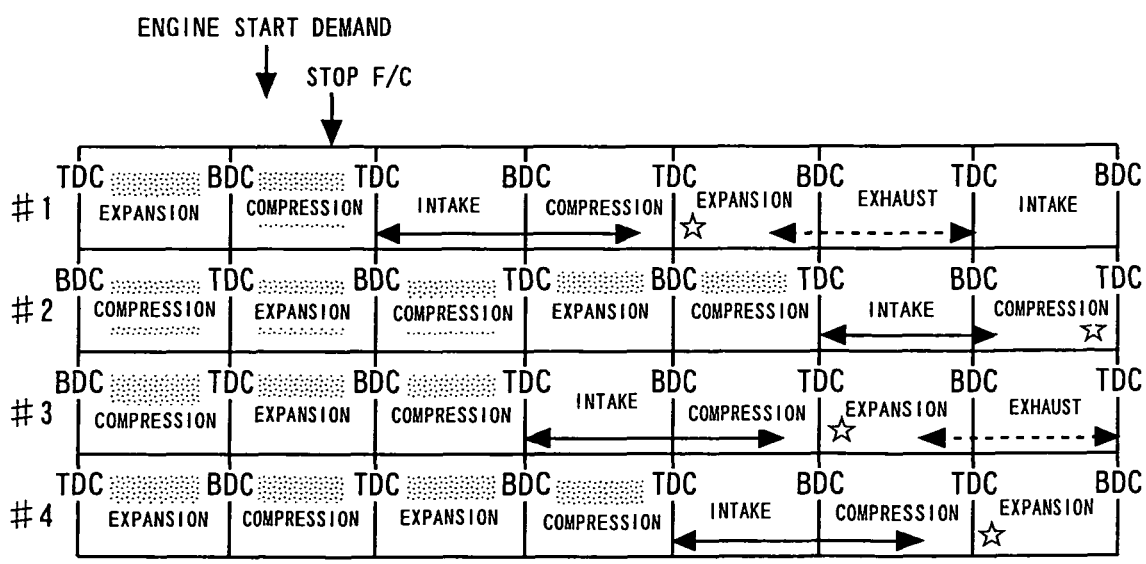
FIG. 25 is a diagram showing valve opening characteristic control of the intake and exhaust valves at the time of restart in the fifth embodiment.

FIG. 25 is a diagram showing valve opening characteristic control of the intake and exhaust valves at the time of restart in the fifth embodiment. In the example shown in FIG. 25, the engine start demand is issued during the compression stroke of the first cylinder #1. Immediately after the engine start demand has been issued, the fuel cut-off operation is stopped for all the cylinders. Then, for the first cylinder #1 and the third cylinder #3, the intake valve 51 is actuated by using the same valve opening characteristics as those used immediately before the operation of the intake valve is stopped. That is, the valve closing timing of the intake valve 51 is not advanced but still retarded so as not to increase the intake air mount. Further, the ignition timing is retarded. In this way, the output torque can be reduced, so that abrupt rise of the torque can be avoided.

Then, for the fourth cylinder #4 and the second cylinder #2, the valve closing timing of the exhaust valve 51 is retarded by the variable valve mechanism 50A to increase the intake air mount and the ignition timing is advanced. The output torque can thus be increased.

Specific Processes in Fifth Embodiment

Figure 26:
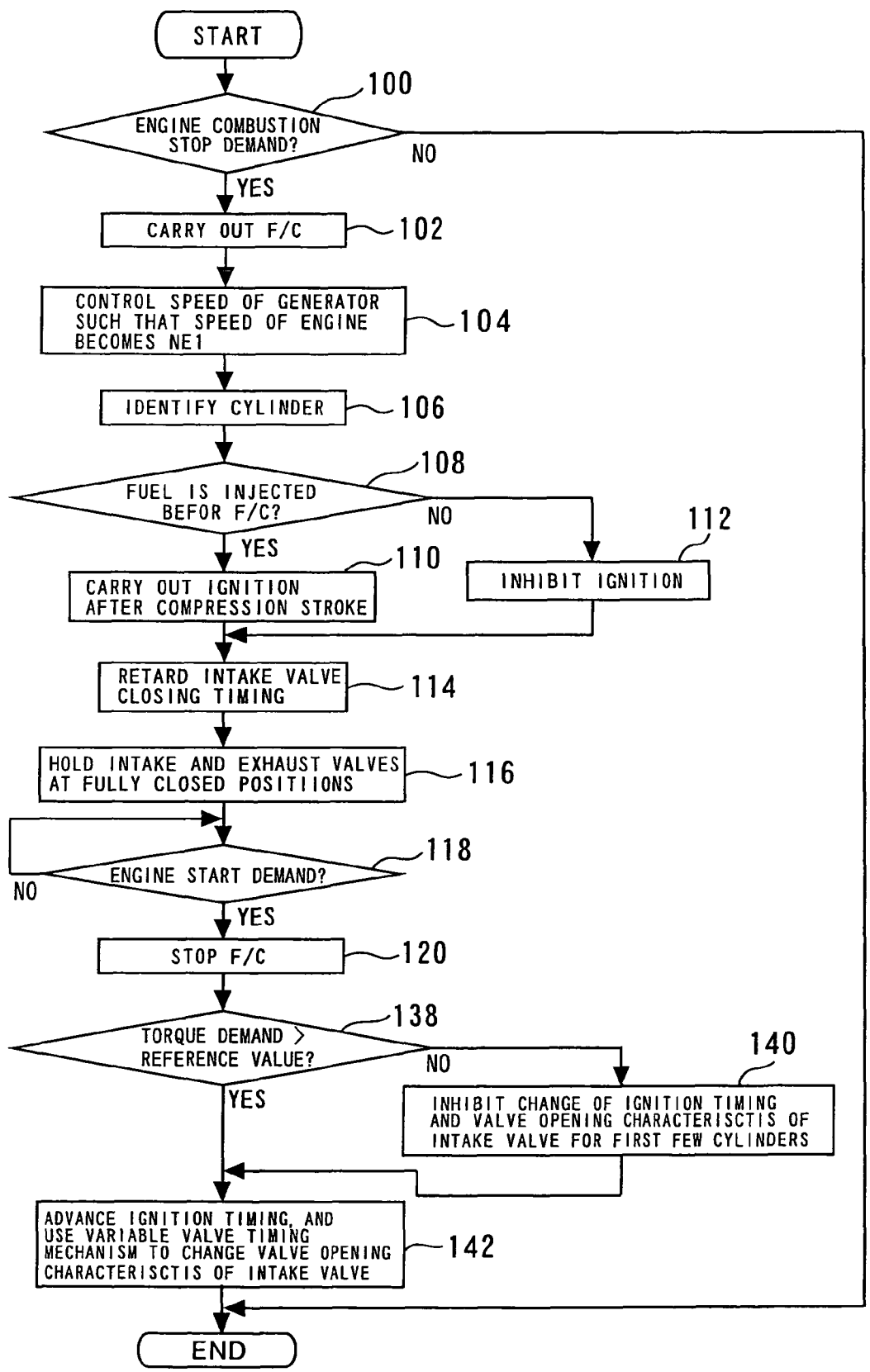
FIG. 26 is a flowchart showing a routine executed by the ECU 70 in the fifth embodiment.

FIG. 26 is a flowchart showing a routine executed by the ECU 70 in the fifth embodiment.

The flow shown in FIG. 26 is similar to that shown in FIG. 13 except that the step 122 is replaced with the steps 138, 140 and 142.

According to the routine shown in FIG. 26, the processes in the step 120 and the preceding steps are carried out in the same manner as the first embodiment. It is then judged whether or not the torque demand is greater than a reference value on the basis of the accelerator opening AA (step 138). The reference value is used to judge whether or not the shock when the engine is restarted can be within tolerance. When it is judged in the step 138 that the torque demand is smaller than or equal to the reference value, it means that increase in output torque will increase the shock when the engine is restarted and the shock will be out of tolerance. In this case, for the first few cylinders after the engine has been restarted, changes of the ignition timing and valve opening characteristics of the intake valve are inhibited (step 140). Abrupt rise of the torque can thus be avoided. Then, the ignition timing is advanced and the valve opening characteristics of the intake valve are changed by the variable valve mechanism according to the torque demand (step 142). The output torque thus increases. Therefore, even when the torque demand is low, the output torque is not abruptly raised, so that the shock when the engine is restarted can be within tolerance.

On the other hand, when it is judged in the step 138 that the torque demand is greater than the reference value, it means that increase in output torque will still likely keep the shock when the engine is restarted within tolerance. In this case, the process in the step 142 is carried out to increase the output torque.

As described above, in the fourth embodiment, when the torque demand is low at the time of engine restart, changes of the ignition timing and the valve opening characteristics of the intake valve are inhibited. In this way, the output torque is not abruptly raised, so that the shock when the engine is restarted can be reduced.

Sixth Embodiment

Features of Sixth Embodiment

In the fourth embodiment, the air-fuel mixture is trapped in each of the cylinders, which allows early ignition.

However, the amount of air-fuel mixture, that is, the amount of air and fuel injection, trapped in each of the cylinders is not determined based on the acceleration demand. Therefore, optimum acceleration according to the acceleration demand may not be provided is some cases. When the acceleration demand is high, sufficient acceleration may not be provided.

After the engine has been warmed up, it is desirable to ensure acceleration response rather than ensuring startup performance.

In view of the above circumstances, in the sixth embodiment of the present invention, the number of cylinders that traps the air-fuel mixture is variable according to how sufficiently the engine 1 is warmed up. Specifically, before the engine 1 is warmed up, excellent startup performance is ensured by trapping the air-fuel mixture in each of the cylinders.

After the engine 1 has been warmed up, the air-fuel mixture is trapped only in the two cylinders #1 and #3, which are ignited in succession. Immediately after the engine start demand has been issued, ignition is carries out for the two cylinders #1 and #3 for early ignition. For the cylinders #4 and #2 that have trapped no air-fuel mixture, the amount of fuel injection and the valve opening characteristics of the intake valve 51 are controlled in an optimum manner according to the acceleration demand. Excellent acceleration response based on the acceleration demand can therefore be provided.

Figure 27:
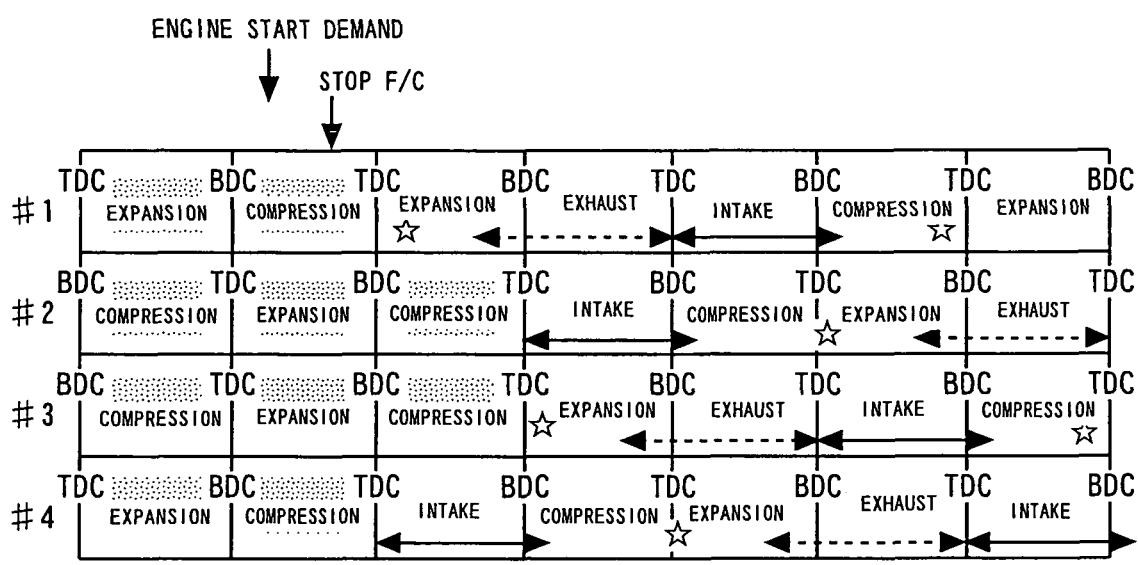
FIG. 27 is a diagram showing valve opening characteristic control of the intake and exhaust valves at the time of restart in the sixth embodiment.

FIG. 27 is a diagram showing valve opening characteristic control of the intake and exhaust valves at the time of restart in the sixth embodiment. In the example shown in FIG. 27, the air-fuel mixture is trapped in the cylinders #1 and #3, since that the engine 1 has been sufficiently warmed up.

The engine start demand is issued during the compression stroke of the first cylinder #1. Immediately after the engine start demand has been issued, the fuel cut-off operation is stopped for all the cylinders. Then, the air-fuel mixture is ignited in the order of the first cylinder #1→the third cylinder #3.

For the fourth cylinder #4 and the second cylinder #2, which follow the third cylinder #3, the amount of fuel injection and the valve opening characteristics of the intake valve 51 are controlled based on the acceleration demand, such as the accelerator opening AA. Optimum acceleration based on the acceleration demand can therefore be provided.

In the example shown in FIG. 27, the engine start demand is issued during the compression stroke of the first cylinder #1. Even when the engine start demand is issued during the compression stroke of the fourth cylinder #4, the same advantageous effect as that in the sixth embodiment can be provided by igniting the air-fuel mixture in the order of the first cylinder #1→the third cylinder #3. Even when the engine start demand is issued during the compression stroke of the second cylinder #2 or the third cylinder #3, optimum acceleration according to the acceleration demand can be provided, although the ignition timing is slightly retarded as compared to that in the sixth embodiment, by waiting one cycle and igniting the air-fuel mixture in the order of the first cylinder #1→the third cylinder #3.

Specific Processes in Sixth Embodiment

Figure 28:
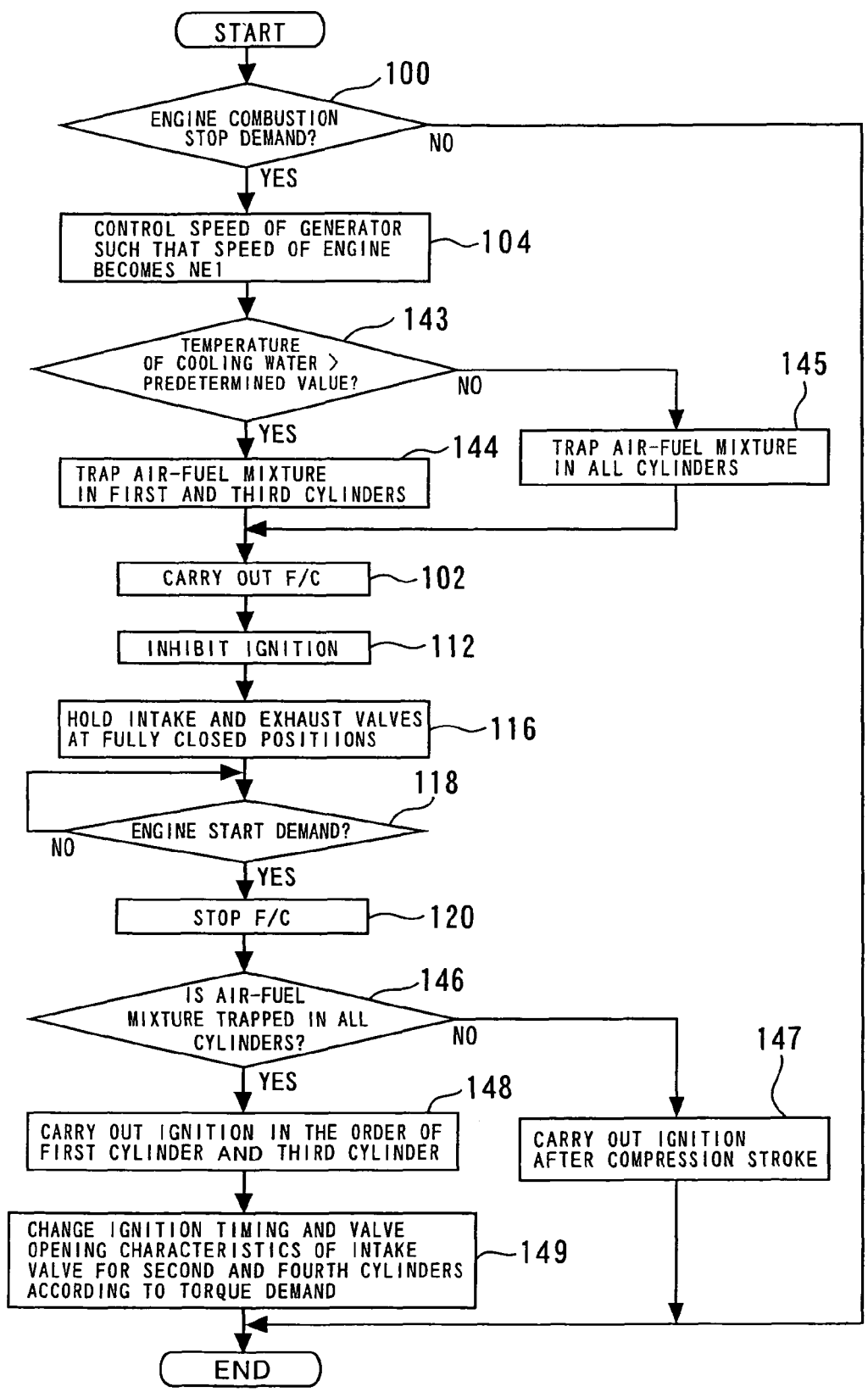
FIG. 28 is a flowchart showing a routine executed by the ECU 70 in the sixth embodiment.

FIG. 28 is a flowchart showing a routine executed by the ECU 70 in the sixth embodiment.

According to the routine shown in FIG. 28, the processes in the step 104 and the preceding steps are carried out in the same manner as the fourth embodiment.

It is then judged whether or not the temperature of the cooling water detected by the cooling water temperature sensor 34 is greater than a predetermined value (step 143). The predetermined value is a reference value for judging whether or not the engine 1 has been sufficiently warmed-up. When it is judged in the step 143 that the temperature of the cooling water is higher than the predetermined value, that is, when it is judged that the engine 1 has been sufficiently warmed-up, the air-fuel mixture will be trapped only in the two cylinders, the first and third cylinders (step 144). On the other hand, when it is judged in the step 143 that the temperature of the cooling water is lower than or equal to the predetermined value, that is, when it is judged that warming-up of the engine 1 is not sufficient, the air-fuel mixture will be trapped in all the cylinders (step 145).

Then, the processes in the steps 102 to 120 are carried out as in the fourth embodiment.

It is then judged whether or not the air-fuel mixture has been trapped in all the cylinders (step 146). When it is judged in the step 146 that the air-fuel mixture has been trapped in all the cylinders, ignition is carried out for the cylinders that have gone through the compression stroke (step 147). On the other hand, when it is judged in the step 146 that the air-fuel mixture is not trapped in all the cylinders, that is, when it is judged that the air-fuel mixture is trapped only in the first and third cylinders, ignition is carried out in the order of the first cylinder→the third cylinder, which have trapped the air-fuel mixture (step 148), independent of the timing when the engine start demand was issued. Then, for the second and fourth cylinders, which have trapped no air-fuel mixture, the ignition timing and the valve opening characteristics of the intake valve are changed according to the torque demand (step 149).

As describe above, in the sixth embodiment, when the engine 1 has been sufficiently warmed-up, the number of cylinders that trap the air-fuel mixture is two. After ignition has been carried out for the two cylinders, the amount of fuel injection and the valve opening characteristics of the intake valve 51 can be controlled in an optimum manner according to the acceleration demand. The output torque based on the acceleration demand can thus be quickly provided. On the other hand, when warming-up of the engine 1 is not sufficient, good startup performance can be ensured by trapping the air-fuel mixture in all the cylinders. It is thus possible to adequately balance the tradeoff between improvement in startup performance of the engine 1 and improvement in output torque.

In the sixth embodiment, although the air-fuel mixture is trapped in two cylinders when the engine 1 has been sufficiently warmed-up, the air-fuel mixture may be trapped only in one cylinder. Further, the number of cylinders that trap the air-fuel mixture may be changed stepwise according to the temperature of the cooling water, for example, all the cylinders→two cylinders→one cylinder.

In the sixth embodiment, the "warm-up state detection means" in the seventh aspect is achieved by causing the ECU 70 to carry out the process in the step 143, and the "holding cylinder number changing means" in the seventh aspect is achieved by causing the ECU 70 to carry out the process in the step 144 or 145.

The invention claimed is:

1. A hybrid vehicle including an engine and other drive means as drive sources, the hybrid vehicle comprising:
   engine rotation control means for rotating the engine at a predetermined speed by using the other, drive means when combustion is stopped in all cylinders of the engine;
   a first variable valve mechanism including an electric motor connected to an intake camshaft that drives an intake valve for each of the cylinders, the first variable valve mechanism capable of changing valve opening characteristics of the intake valve by driving the electric motor;
   a second variable valve mechanism capable of changing valve opening characteristics of an exhaust valve for each cylinder;
   variable valve mechanisms control means for controlling the first and second variable valve mechanisms to hold the intake and exhaust valves closed for at least one cylinder while the engine rotation control means rotates the engine when the combustion is stopped in all cylinders of the engine;
   combustion start control means for, when the engine is restarted, driving the electric motor of the first variable valve mechanism to change the valve opening characteristics of the intake valve for a cylinder identified as performing intake stroke as next action based on a crank angle and for starting the combustion in the engine while the engine rotation control means rotates the engine; and
   air-fuel mixture holding means for holding air-fuel mixture in the cylinder by sucking the air-fuel mixture into a cylinder and by inhibiting ignition of the air-fuel mixture before the operation of the intake and exhaust valves is stopped,
   wherein the engine rotation control means rotates the engine with the air-fuel mixture held in the cylinder by the air-fuel mixture holding means, and the combustion start control means ignites the air-fuel mixture held in the cylinder.

2. The hybrid vehicle according to claim 1, further comprising:
 warm-up state detection means for detecting a warm-up state of the engine; and
 holding cylinder number changing means for changing the number of cylinders in which the air-fuel mixture is held by the air-fuel mixture holding means according to the warm-up state detected by the warm-up state detection means.

* * * * *